United States Patent
Costa

(10) Patent No.: US 10,931,652 B2
(45) Date of Patent: Feb. 23, 2021

(54) DATA SEALING WITH A SEALING ENCLAVE

(71) Applicant: Microsoft Technology Licensing, LLC, Redmond, WA (US)

(72) Inventor: Manuel Costa, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/414,492

(22) Filed: Jan. 24, 2017

(65) Prior Publication Data
US 2018/0212939 A1    Jul. 26, 2018

(51) Int. Cl.
| H04L 29/06 | (2006.01) |
| G06F 12/14 | (2006.01) |
| G06F 21/62 | (2013.01) |
| G06F 21/60 | (2013.01) |

(52) U.S. Cl.
CPC ........ *H04L 63/061* (2013.01); *G06F 12/1408* (2013.01); *G06F 21/602* (2013.01); *G06F 21/6209* (2013.01); *G06F 2212/1052* (2013.01)

(58) Field of Classification Search
CPC . H04L 63/061; G06F 12/1408; G06F 21/602; G06F 21/6209; G06F 2212/1052
See application file for complete search history.

(56) References Cited

U.S. PATENT DOCUMENTS

| 8,176,283 | B1* | 5/2012 | Hanson ............... G06F 12/14 380/264 |
| 8,208,637 | B2 | 6/2012 | Ellison et al. |
| 8,438,631 | B1* | 5/2013 | Taylor ............... G06F 21/6236 726/15 |
| 9,584,517 | B1* | 2/2017 | Roth ............... G06F 21/6209 |
| 10,530,777 | B2 | 1/2020 | Costa |
| 2008/0077994 | A1* | 3/2008 | Comlekoglu ........ G06F 21/53 726/27 |
| 2009/0038017 | A1 | 2/2009 | Durham et al. |
| 2010/0154032 | A1* | 6/2010 | Ollmann ............... G06F 21/552 726/3 |
| 2012/0265976 | A1 | 10/2012 | Spiers et al. |
| 2013/0312117 | A1* | 11/2013 | Sapp, II ............... G06F 21/62 726/30 |
| 2015/0033012 | A1* | 1/2015 | Scarlata ............... H04L 9/3242 713/161 |

(Continued)

FOREIGN PATENT DOCUMENTS

| CL | 2019002007 A1 | 12/2019 |
| CL | 2019002010 A1 | 12/2019 |

OTHER PUBLICATIONS

"International Search Report and Written Opinion Issued in PCT Application No. PCT/US2017/067455", dated Mar. 28, 2018, 10 Pages.

(Continued)

*Primary Examiner* — Shin-Hon (Eric) Chen
(74) *Attorney, Agent, or Firm* — Wade IP Law LLC

(57) ABSTRACT

Techniques for securely sealing and unsealing enclave data across platforms are presented. Enclave data from a source enclave hosted on a first computer may be securely sealed to a sealing enclave on a second computer, and may further be securely unsealed for a destination enclave on a third computer. Securely transferring an enclave workload from one computer to another is disclosed.

20 Claims, 23 Drawing Sheets

(56) References Cited

U.S. PATENT DOCUMENTS

| | | | | |
|---|---|---|---|---|
| 2015/0200949 | A1* | 7/2015 | Willhite | H04L 63/101 |
| | | | | 726/13 |
| 2015/0304736 | A1* | 10/2015 | Lal | G06F 21/10 |
| | | | | 380/210 |
| 2015/0347768 | A1* | 12/2015 | Martin | G06F 21/62 |
| | | | | 726/1 |
| 2016/0149912 | A1* | 5/2016 | Scott-Nash | H04L 63/0876 |
| | | | | 713/176 |
| 2016/0171248 | A1 | 6/2016 | Nesher et al. | |
| 2016/0335453 | A1* | 11/2016 | Kounga | G06F 21/6245 |
| 2017/0185752 | A1* | 6/2017 | Lemay | H04L 67/1097 |
| 2017/0185766 | A1* | 6/2017 | Narendra Trivedi | G06F 21/53 |
| 2017/0288875 | A1* | 10/2017 | Xing | H04L 9/3242 |
| 2018/0096137 | A1* | 4/2018 | Trostle | G06F 21/53 |
| 2018/0183580 | A1 | 6/2018 | Scarlata et al. | |

OTHER PUBLICATIONS

"Final Office Action Issued in U.S. Appl. No. 15/414,371", dated Jun. 5, 2020, 27 Pages.

"Final Office Action Issued in U.S. Appl. No. 15/414,371", dated Jul. 8, 2019, 16 Pages.

"Non Final Office Action Issued in U.S. Appl. No. 15/414,371", dated Dec. 17, 2018, 15 Pages.

"Non Final Office Action Issued in U.S. Appl. No. 15/414,371", dated Dec. 31, 2019, 19 Pages.

"Office Action Issued in European Patent Application No. 17829495.5", dated Jul. 29, 2020, 5 Pages.

Norton et al., "Trusted Execution Development: Designing a Secure, High-Performance Remote Attestation Protocol", Retrieved From: https://web.wpi.edu/Pubs/E-project/Available/E-project-102416-145000/unrestricted/Trusted_Execution_Development.pdf, Oct. 13, 2016, 64 Pages.

Noubir et al., "Trusted Code Execution on Untrusted Platforms using Intel SGX", in the Conference of Virus Bulletin, Oct. 2016, 7 Pages.

"International Search Report and Written Opinion Issued in PCT Application No. PCT/US17/067452", dated Apr. 4, 2018, 10 Pages.

"Office Action and Search Report Issued in Chile Patent Application No. 201902009", dated Nov. 11, 2020, 13 Pages.

* cited by examiner

US 10,931,652 B2

DATA SEALING WITH A SEALING ENCLAVE

TECHNICAL FIELD

This disclosure relates to secure computing systems.

BACKGROUND

Secure isolated regions or trusted execution environments provide a secure container, referred to as an enclave herein, for executing trusted code on a computer that may also have less trusted code in a region outside of the isolated region. An enclave's isolated region includes a portion of memory that is protected during execution of code residing outside the enclave. The isolated memory may contain both code and data for the enclave, and the protection of this memory may include restrictions executing code contained in the enclave memory in addition to restrictions on reading from or writing to enclave memory. Aspects of enclave security, such as memory isolation and execution restrictions, may be enforced, for example, by hardware in the computer processor. Software attestation may provide trust in the isolation security of a particular enclave and in the enclave code that is loaded within the isolated memory region of that particular enclave. Attestation may additionally provide proof of the integrity of the hardware and software platform on which the attested enclave is running.

Enclave systems, such as Microsoft's Virtual Secure Mode (VSM) and Intel's Software Guard Extensions (SGX) provide security in part by isolating an enclave from other code running in either user mode or kernel mode. Integrity and confidentiality guarantees may provide an enclave with a higher level of trust in the authenticity of code running in an enclave, and trust in the safe execution of the enclave code. An integrity guarantee may be provided by software attestation of a particular enclave. Software attestation may include a cryptographically signed hash of the contents (instructions and data) inside an enclave and may be combined with data about the enclave environment. When an enclave is used in combination with a hardware security module (HSM), such as hardware conforming to a Trusted Computing Group (TCG) Trusted Platform Module (TPM) standard, the enclave can provide an additional level of security and confidentiality guarantees.

In addition to the security provided by isolation of a trusted local enclave from untrusted local code outside of the enclave's isolation, software attestation of an enclave can enable remote trusted computing. Attestation of a remote enclave may provide trust both in the integrity of the execution of instructions in the enclave, as well as in the confidentiality of data processed by the enclave. When attestation of a remote enclave is provided by hardware from a trusted manufacturer, an enclave may be trusted even when the enclave resides on an unknown computer that is owned and maintained by an untrusted party. This is often the case, for example, when computing resources are rented on an Internet cloud-based computing resource.

SUMMARY

Methods and systems are presented for abstracting an enclave platform. The method may comprise receiving, by an enclave abstraction platform, a first request to use an enclave from an enclave client. The first request may conform to a client abstraction protocol. The first request may be converted to a second request which conforms to an enclave native protocol associated with an enclave native platform. The second request may then be sent to the enclave native platform. The first request may be, for example, a request to instantiate an enclave, a request to verify an attestation report of an enclave, a request to call into an enclave, or a request to allocate memory that is shared with both the enclave and the enclave client. The native platform may conform to the Intel Software Guard Extensions (SGX) enclave architecture and the native platform may conform to the Microsoft Virtual Secure Mode (VSM) enclave architecture.

DETAILED DESCRIPTION OF ILLUSTRATIVE EMBODIMENTS

Figure 1:
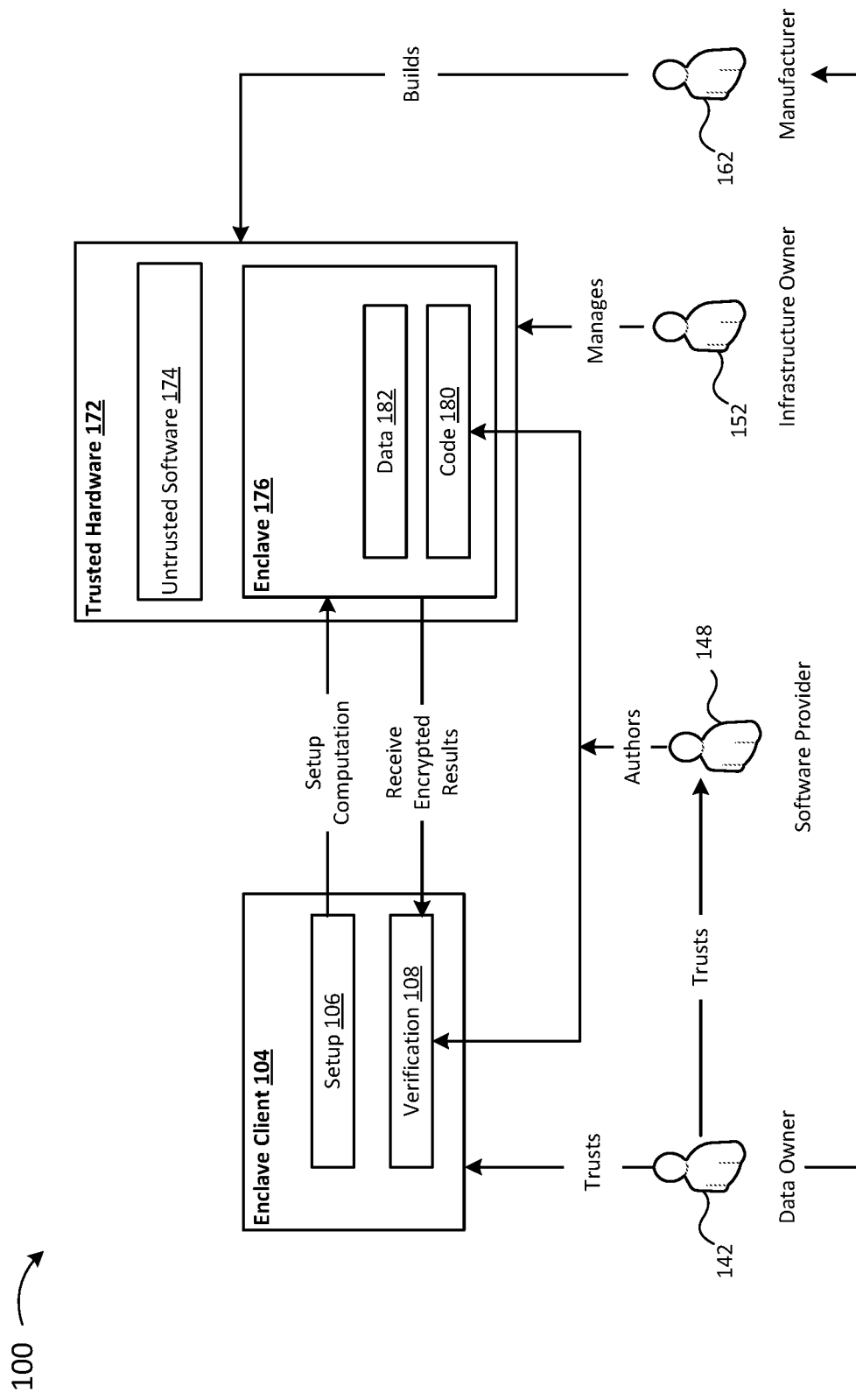
FIG. 1 depicts an example high-level block diagram of an enclave system.

An abstraction model for enclaves is disclosed that simplifies development of enclave clients and of the software that runs inside an enclave. An abstraction model may be a simplification and unification of native enclave platform architectures, such as Intel's SGX and Microsoft's VSM. An abstraction layer software component may translate communication between an enclave client and one or more native platforms, between software inside an enclave and one or more native enclave platforms, and between software inside an enclave and an enclave client. Such an abstraction platform may provide the benefit of enabling a single version of enclave software and enclave client software to run on top of multiple native enclave platforms, such as SGX and VSM. In addition to simplifying the task of writing software for enclaves and enclave clients, it allows end-users of enclaves to run enclave and enclave client software on a computer that supports any supported native enclave architecture without having to find versions of both enclave and enclave client software that are tailored to a specific computer's native enclave platform.

An enclave abstraction model may, for example, include primitives for: managing the lifecycle of an enclave, local and remote attestation of an enclave, sealing data to an enclave, program transfer control into and out of an enclave, and other security features such as monotonic counters and trusted time. An abstract or layered identity of an enclave is also presented that abstracts an enclave's identity beyond a single binary or a single hash of an enclave's contents. Software component interfaces, such as an application programming interface (API) or application binary interface (ABI) are presented for development of enclaves and enclave client programs using abstraction model primitives.

An abstract identity may include a nested identity or identity hierarchy that may be used to securely identify groups of enclave instances. An enclave instance herein may refer to the same enclave binary code loaded into an enclave on the same machine and have the same identity. On the other hand, a new version of the binary code, or the same binary code loaded onto a different machine, might be considered a different instance. These different instances may also have the same identity at a higher level in an identity hierarchy. An abstracted enclave identity enables groups of related enclave binaries to be identified as related. For example, different versions of the same enclave, such as the versions of enclave binaries before and after a bug is fixed, may be given the same name, independent of version. At a higher layer of abstraction, all enclaves in a family of enclaves can be given a single family name or identity. In this case, all enclaves that perform related but different functions may be identified together. Other identity layers or groupings of identities are described below.

Any layer of an abstract identity can be used for various cryptographic operations, such as sealing data, attestation of an enclave, or guaranteeing data freshness (via monotonic counters). For example, by sealing data produced by one enclave instance to a higher level identity, that data can then later be securely consumed by a different enclave instance with the same higher level enclave identity. By sealing data to, for example, an enclave family, any enclave instance that is a member of that family, and only members of that family, will be able to unseal the data. Attestation to a family identity from an enclave instance provides assurance that the enclave instance is a member of that family. Monotonic counters tied to an identity abstraction may provide freshness guarantees related to all enclave instances that are members of the abstraction identity.

The disclosed abstraction model includes software component interfaces, such as an application programming interface (API) or application binary interface (ABI), that may simplify software development of enclaves and enclave hosts. An API is a set of programming subroutine definitions, protocols, and tools for creating software. An API may define the inputs and outputs of a software component, data types used by the software component, and the functionality or operation of the software component independent of any particular implementation of the software component. An API may be defined in a high-level computer language, such as C, C++, C#, and the like. A formalized definition of an API may facilitate interaction between software components, for example two software components written at different times or by different authors. An API may be formalized in part with an interface description language (IDL) such as Microsoft Interface Definition Language (MIDL) or Object Management Group (OMG) IDL. An ABI is also an interface between software components, but is an object code interface. For example, an ABI may be entry points (or the instruction addresses) of object code resulting from compiling a source code implementation of an API along with protocols for using those entry points, such as protocols specifying machine registers that hold arguments when the entry points are called.

In addition to enabling interaction with different levels of enclave identity as described above, an enclave API may abstract away the differences between enclave platform architectures, for example between architectures for secure isolated execution provided by Intel's Software Guard Extensions (SGX), Microsoft's Virtual Secure Mode (VSM), and ARM TrustZone, AMD's Secure Encrypted Virtualization (SEV), and architectures based on Field Programmable Gate Arrays (FPGAs). APIs include interfaces for an enclave platform that abstracts some details of the abstracted enclave architectures. These enclave platform interfaces include an enclave host API, an enclave platform API, and a remote attestation API. The enclave host API may be used by an untrusted host process to manage the lifecycle of an enclave as well as provide communication to and from an enclave. The enclave platform API may be provided by the trusted enclave platform to the enclave, and may include security primitives for attestation, sealing, and communication with the untrusted code running on the computer hosting the enclave computer, as well as core runtime support such as memory management and thread scheduling. The remote attestation API may be used to perform remote attestation, where an enclave and its client are not hosted on the same computer. For example, the remote attestation API can be used by a local client to verify that data originated (or was sent) from an enclave with a certain identity running under isolation provided by an enclave platform on a remote computer. More generally the remote attestation API can be used to establish secure communication channels between a local client and the remote enclave.

Enclaves generally provide solutions to problems that are specific to, and arise from, the realm of computer technology. More specifically, enclaves provide a mechanism for segregating trusted code from untrusted code where both trusted and untrusted code segments reside within the address space of a single computer processor. For example, enclaves provide a security solution to the problem of potentially untrusted code (such as code potentially containing either bugs or viruses) running on the same general purpose computer as code that must access sensitive or private data. Embodiments of this disclosure provide further improved solutions to such security problems arising from the realm of computer technology, including: simplifying software development by enabling a single enclave or enclave client to be authored for multiple native enclave platforms; simplifying corporate computer management by reducing the number of software components that must be customized to specific hardware features of a particular computer; and enabling new secure computing scenarios with distributed data sealing, such as distributing secure enclave processing across enclaves hosted on multiple computers.

FIG. 1 depicts a high-level block diagram of an enclave system along with some trust relationships. Enclave system 100 includes an enclave 176 (alternately called an enclave container or secure execution environment), which includes a secure isolated region of memory that contains code 180 and data 182. Code 180 may be public or private, and data 182 may be public or private. For example, the private data or code may belong to (or be private to) a data owner 142, while public data or code may have been provided by another party, such as software provider 148. In one embodiment, code that runs within an enclave container 176 may be completely public and not private, while the data that the public enclave code uses as input or produces as output may be private. In another embodiment, the reverse is possible, where the code is private while the data is public. In yet another embodiment, both the code and input data may be public, while the output of running the code with the input data may be private. Other public and private combinations of code, input data, and output data are possible.

The enclave 176 container is hosted on trusted hardware 172, which may simultaneously host untrusted software 174. A primary purpose of the enclave system 100 may include at least one aspect selected from the list consisting: of the maintaining integrity of the code 180, maintaining confidentiality of the code 180, maintaining the integrity of the data 182, and maintaining the confidentiality of the data 182. Protecting the contents of the enclave 176 from untrusted software 174 (e.g., disclosure to untrusted software, modification by untrusted software, or the like) may be a goal. Trusted hardware is built by manufacturer 162, and is owned and managed by infrastructure owner 152.

Enclave client 104 may be a process or program outside of the enclave container for which the enclave 176 performs its computations with code 180 and data 182. In a local enclave embodiment, enclave client 104 may also be running on the trusted hardware 172. In a remote enclave embodiment, the enclave client may run on one computer while the trusted hardware 172 is a different, remote computer, connected to the enclave client's computer via a network. In the local enclave case, the enclave client process may also be the enclave host process of the enclave container 176 in that the enclave client process may manage the creation of the local enclave 176. In the remote enclave case, the enclave 176 may, for example, be run on an internet cloud computer where the infrastructure owner 152 is a cloud computing service provider, and the cloud computer includes trusted hardware 172 that is manufactured by manufacturer 162.

The enclave client 104 may include a setup 106 method to setup a requested computation by enclave 176. The setup 106 method may include causing creation of the secure container of enclave 176, causing instantiation of the enclave (for example, by sending a request to untrusted software 174 to ask for the instantiation of the enclave), which may include copying binary code into the secure container, and causing or requesting a computation in the enclave, for example by calling a method in the code copied into the secure container. The requested computation may include executing code 180, and data 182 may be input to, or may be a result of, the requested computation. Data input to the requested computation may be encrypted when outside the enclave, and encrypted input data may be decrypted prior to being used inside the enclave. Once the enclave 176 has completed the requested task, data representing the result of the task are encrypted and sent back to the enclave client 104. When the enclave client 104 receives the encrypted results, a verification 108 method may confirm the integrity and freshness of the received results. A single software provider 148 may provide both the code 180 to run inside the enclave 176, and at least a portion of the verification 108 method that runs as part of the enclave client 104.

A data owner's confidence in the privacy of a private portion of data 182 and a private portion of code 180, as well as confidence in the correctness of the results produced by enclave 176, may be based on trust relationships. For example, a data owner 142 may trust the enclave client 104, which may not be running within an enclave container itself. The data owner may further trust the software provider 148 of the enclave itself. And the data owner may trust the manufacturer of the trusted hardware 172. The trusted hardware 172 may take many forms depending on the enclave architecture used, and may include a hardware security module (HSM), where the HSM conforms, for example, to the Trusted Platform Module (TPM) standard. The trusted hardware 172 may include, for example, a TPM and might otherwise comprise only hardware. For example, an implementation of trusted hardware 172 using Microsoft's VSM enclave architecture may include a commodity processor with instructions for operating system virtualization instructions and a TPM. Microsoft's VSM enclave architecture may include a hypervisor for managing guest partitions (virtual processors), and the hypervisor may expose hypercall interfaces to guest partitions to allow the guest partitions to interact with the hypervisor. An enclave container in Microsoft's VSM architecture may be implemented as a special type of guest partition. An example of trusted hardware 172 with Intel's SGX enclave architecture may include a processor with special enclave-specific instructions and security functionality.

An enclave, such as enclave 176, may provide an isolated execution environment which may protect code or data, such as code 180 and data 182, by providing a region of memory with restrictions on reading, writing, or executing from that protected region. This protected memory region is a secure container for confidential code and data. Restrictions on executing from an enclave's protected memory region may include restrictions on execution transfers, such as call or jump instructions, between code outside the enclave to code inside the enclave, and vice versa. Different restrictions may be enforced between calling into the enclave from outside the enclave and calling out of the enclave from inside the enclave. Enforcement of these execution transfers between inside and outside of an enclave may be provided by hardware, for example with commodity virtualization hardware technology or with specialty hardware such as INTEL's SGX platform.

Figure 2:
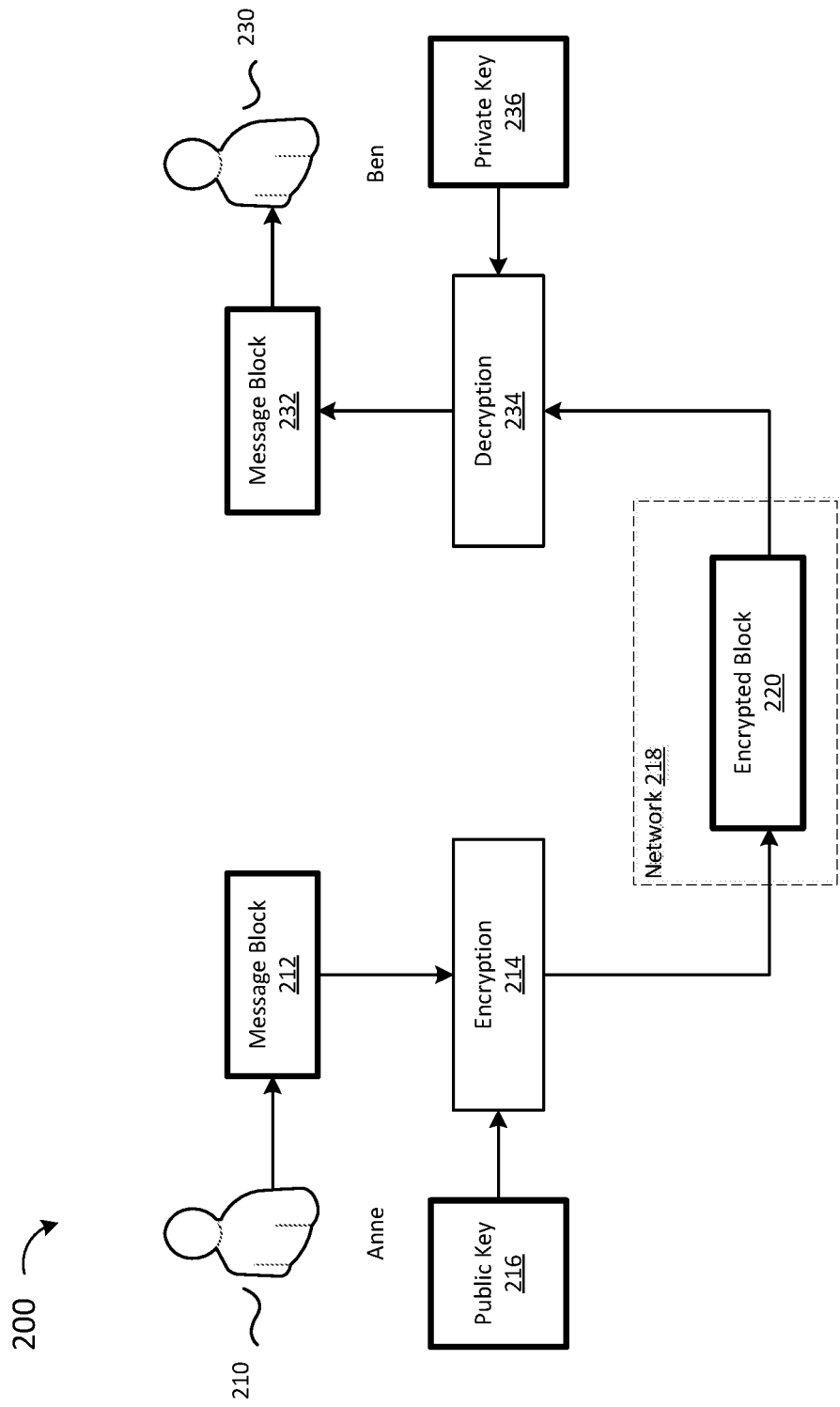
FIG. 2 depicts an example process for message passing with a confidentiality guarantee.

FIG. 2 depicts an example process 200 for message passing with a confidentiality guarantee. A confidentiality guarantee provides some level of assurance that communication between two parties, such as Anne 210 and Ben 230 in this example, remains hidden from third parties when messages are passed through a public or unprotected communication medium such as network 218. In this example, Anne 212 would like to send a confidential message to Ben 230. A message block 212 containing confidential data is encrypted using public key 216 by an encryption 214 operation. The encryption 214 operation may be, for example, Advanced Encryption Standard Galois/Counter Mode (AES-CGM), but may also be any encryption operation known to those of skill in the art of digital cryptography. The encrypted block 220 may pass through a network 218 to Ben where the encrypted block 234 is decrypted with private key 236 to produce the unencrypted message block 232 for Ben. With careful selection of keys and encryption algorithms, as is known in the art of computer data encryption, the message can remain confidential even when passing through a public network.

Figure 3:
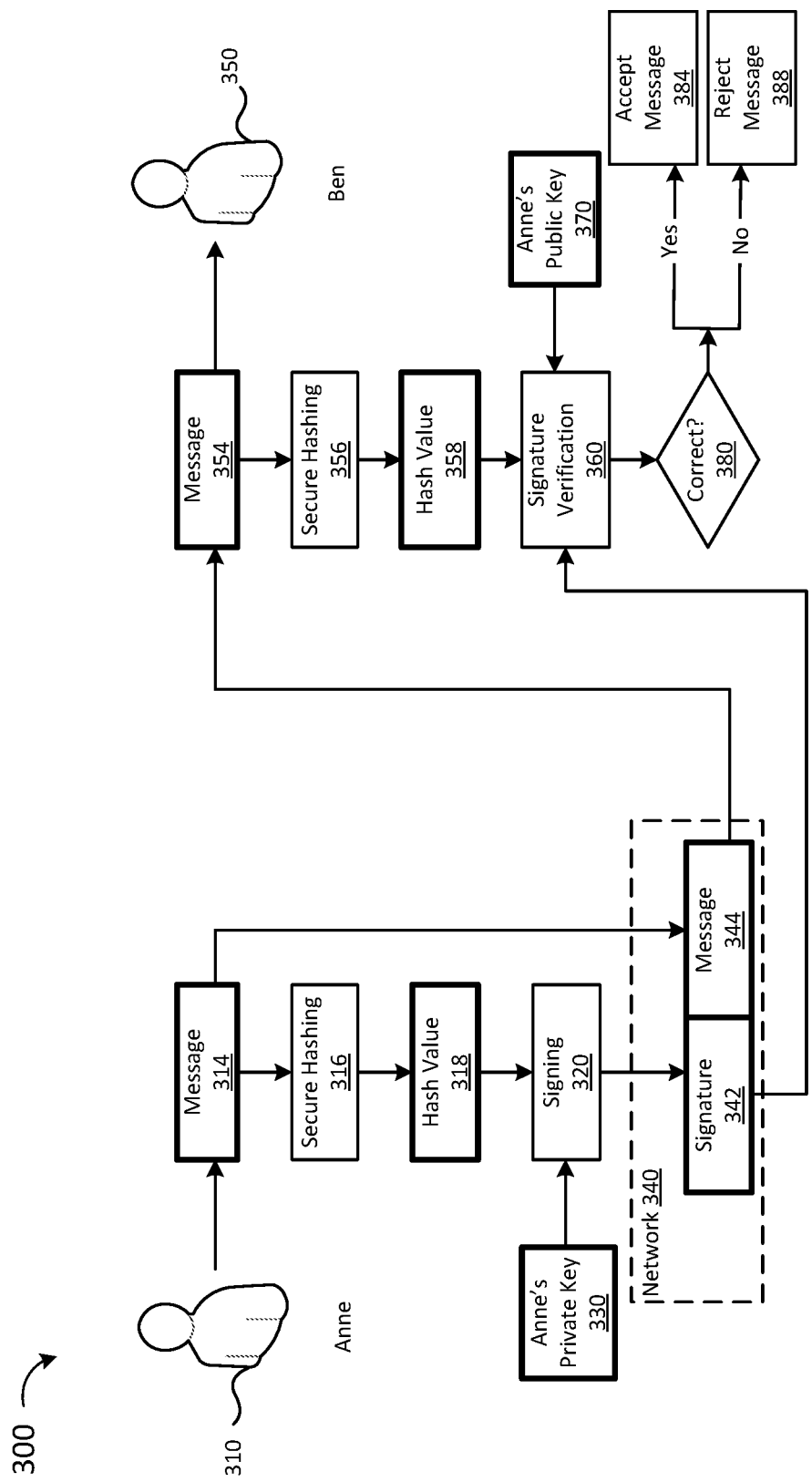
FIG. 3 depicts an example process for message passing with an integrity guarantee.

FIG. 3 depicts an example process 300 for message passing with an integrity guarantee. An integrity guarantee provides some level of assurance that communication between two parties, such as Anne 310 and Ben 350 in this example, is not tampered with or otherwise altered when messages are passed through a public or unprotected communications medium such as network 340. In the example of FIG. 3, Anne 310 sends a message 314 to Ben 350 such that there is confidence that the message 314 is not tampered with or otherwise corrupted when Ben 350 receives it. To provide this integrity guarantee, a secure hashing 316 process operates on message 314 to produce a hash value 318. The hash value 318 is then signed by signing 320 process using Anne's private key to produce a signature 342. Signature 342 may be sent across a public network 340 or other unprotected communication process along with a copy of message 314 as message 344. Ben then receives a message 354 for which Ben would like to verify the integrity, such that Ben may have confidence that message 354 is the same as the message 314 that Anne sent after having passed through an untrusted network 340. To verify the integrity, the received message 354 is processed by secure hashing 356 that is identical to secure hashing 316 to produce hash value 358. The received signature 342 is verified by signature verification 360 process using Anne's public key. The hash value 318 which is extracted from signature 342 is then compared to hash value 358 to verify 380 that the signatures are the same. If they are the same, the message is accepted 384 as having integrity. Alternately, if the message 314 was altered in any way before being received as message 354, then the signature will not be correct and the message will be rejected 388.

In some embodiments, secure hashing 316 and the secure hashing 356 may be a cryptographic hash function. A cryptographic hash function is a one-way function that maps data of arbitrary size to a bit string of a (typically much smaller) fixed size. The output of a hash function may be called a hash value or simply a hash. A good hash function will be one-way in that it will be difficult to determine the arbitrarily sized input given only the hash output. With a good hash function, even a small change in the input will produce a change in the output.

A communication system can combine the confidentiality and integrity guarantees. For example, the message block encryption of FIG. 2 can be combined with the signing of a message hash of FIG. 3. The combination system may require two sets of public/private keys pairs, one for the sender and one for the receiver. A combination system may use one private key at the receiver to decrypt a message (Ben's private key as in FIG. 2), while using another private key to sign the message hash (Anne's private key as in FIG. 3).

Figure 4:
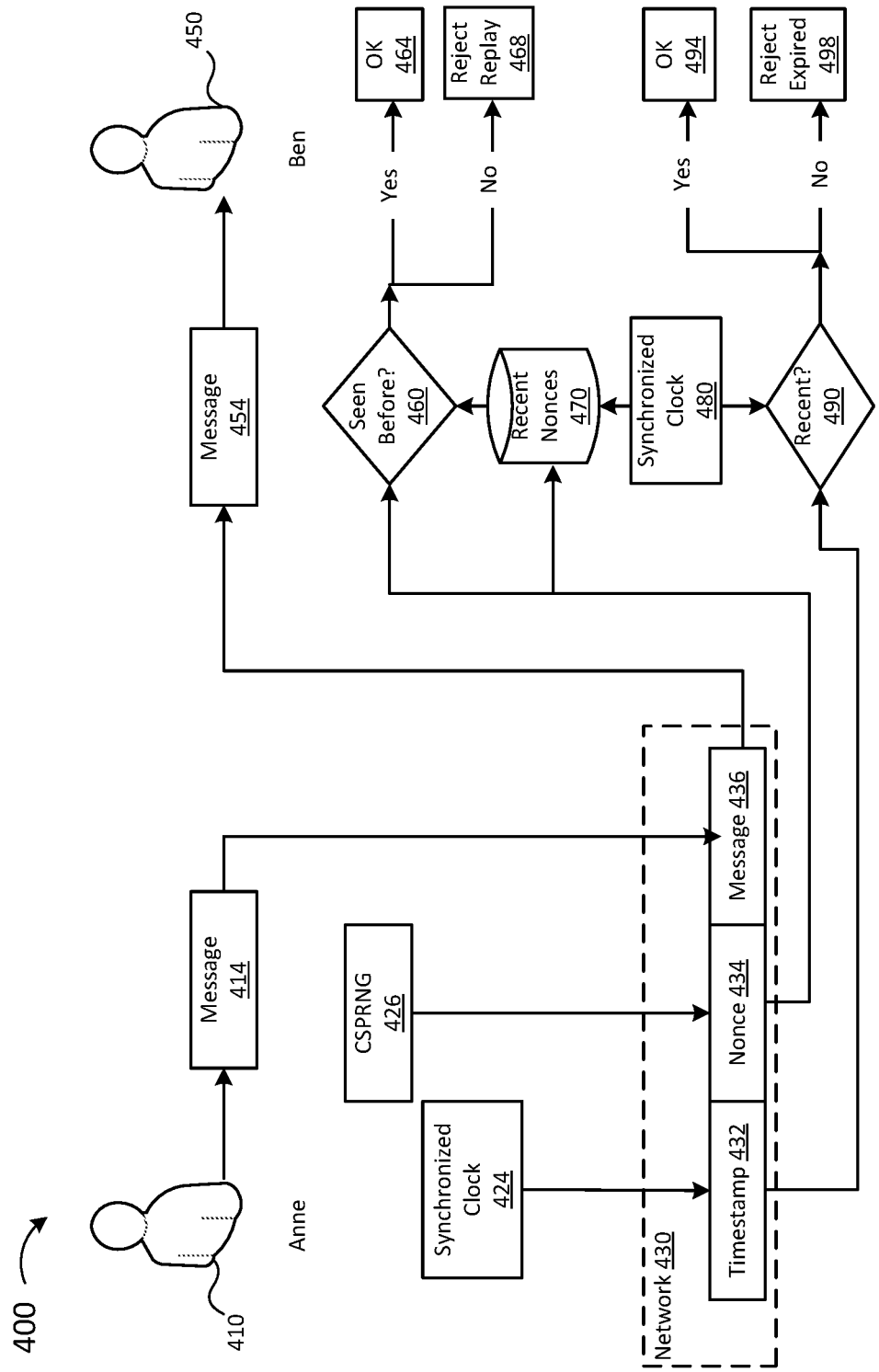
FIG. 4 depicts an example process for message passing with a freshness guarantee.

FIG. 4 depicts an example process 400 for message passing with a freshness guarantee. A freshness guarantee provides some level of assurance that when multiple messages are sent from one party to another, such as from Anne 410 to Ben 450 in this example, the message received at the receiver is the most recent message. A freshness guarantee may be built upon an integrity guarantee, and can prevent replay attack. With an integrity guarantee, it is difficult for a third party with nefarious intent to create its own message and send it to Ben such that Ben understands the message to have been created by Anne. However, a third party can take a message actually created by Anne, perhaps observed at one time as it was sent over a public network, and the third party may resend it to Ben at another later time (i.e. replay the message). Ben will determine the message was actually created by Anne (because it was), but Ben will not know that Anne is not the person who sent it at that time. This may be called a replay attack on Ben or Anne by the third party. FIG. 4 is an example solution for preventing replay attacks by providing a freshness guarantee using nonces and timestamps. A nonce is a single-use random number, coupled with a system for ensuring that the same number is never used as a nonce more than once. In some systems a nonce may simply be a monotonically increasing number, such that every number used is higher than all the numbers that came before it.

In FIG. 4, Anne's message 414 may be sent over a public network 430 as message 436 along with nonce 434 and timestamp 432. The nonce 434 is generated by a cryptographically secure pseudorandom number generator (CSPRNG) 426, and the timestamp 432 is produced by a synchronized clock 424. There are many CSPRNG systems that are known to those of skill in the art of digital cryptography. The synchronized clock 424 on Anne's side of network 430 is synchronized with the synchronized clock 480 on Ben's side of the network. On Ben's side, when a message 454 is received, the accompanying nonce 434 is stored in a cache of recent nonces 470. The freshness of that received message 450 may be verified with two tests. First, the nonce 434 is tested in box 460 by comparing nonce 434 to the cache of recent nonces 470 to determine if the currently received nonce 434 has been seen before. If the received nonce 434 has been seen before, message 454 is rejected as a replay message in box 468. If the received nonce 434 has not been seen before, the message is determined to be OK in box 464 for this first test. Second, the received timestamp 432 is compared to local synchronized clock 490. If the timestamp is recent, the message 454 is determined to be acceptable in box 494, otherwise the message 454 is rejected as expired in box 498. The amount of delay tolerated when determining if a recent timestamp is recent in box 490 may depend on expected clock skew between synchronized clock 424 and synchronized clock 480 and time delays in message processing and transmission through network 430.

A communication system can combine a freshness guarantee with either or both a confidentiality guarantee, as in FIG. 2, and an integrity guarantee, as in FIG. 3. In a system combining all three, the message 436 sent over the network 430 will be an encrypted version of Anne's original message 414, and a signature comprising a signed hash of the message 414 would be included along with the timestamp 432, nonce 434, and message 436.

Figure 5:
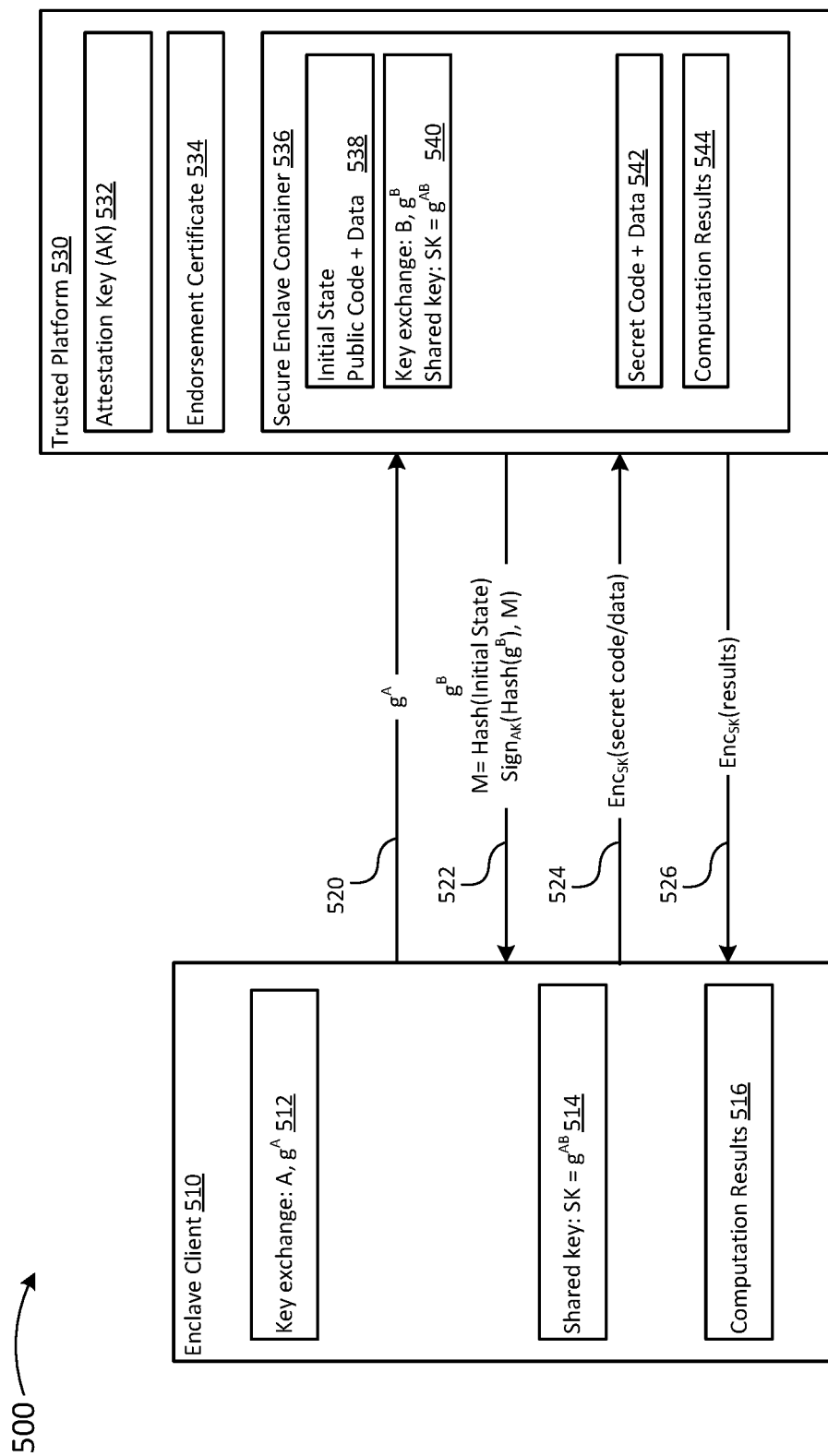
FIG. 5 depicts an example process for software attestation of an enclave.

FIG. 5 depicts an example process 500 for software attestation of an enclave. Software attestation, when combined with a key agreement protocol such as that of FIG. 6, can assure a verifier that it has established a shared secret with a specific piece of software that is hosted inside an isolated container created by trusted hardware. In the embodiment of FIG. 5, an enclave client 510 (the attestation verifier) may wish to use the secure computation services of enclave on the trusted platform 530. The trusted platform 530 is hosted on a computer (not pictured) such that the trusted platform 530 may comprise a subset of the hosting computer. Trusted platform 530 may comprise hardware elements and software elements of the hosting computer. The enclave comprises a secure enclave container 536 and the code and data inside it, such as public code and data 538 and secret code and data 542.

Three processes are combined in the example process 500: a key exchange process that produces a shared key SK; an attestation process for attestation to enclave client 510 of the enclave on trusted platform 530; and a secure computation are done. The shared key SK from the first process is used for communicating inputs and outputs of the secure computation. In the key exchange, the enclave client computes $g^A$, stored in box 512, from the enclave client's private key A and a generator function g, for example as described below for the Diffe-Hellman key exchange (DKE) protocol of FIG. 6. The computed $g^A$ is then sent in message 520 to the trusted platform 530. Message 520 may be safely sent without encryption and before attestation is complete. Software inside the secure enclave container 536 may use an enclave private key B to compute $g^B$ using the same generator function g. Both B and $g^B$ may be stored in the enclave container in box 540.

To attest the identity of the enclave (to provide assurance about what code running inside the secure enclave container 536), an attestation message 522 is sent to the enclave client 510. An attestation message may be a special message signed for integrity as in FIG. 3. The special message may contain identity information about the enclave. When combined with DKE as in the embodiment of FIG. 5, the special message may also include key exchange parameters. In embodiment of FIG. 5, the secure enclave container's 536 initial state 538 of public code and public data are used as an enclave identity, though other identities are possible. Instead of sending the entire initial state 538 in an attestation message, a hash of the initial state, M=Hash(Initial State), is sent instead. The attestation message 522 includes the message contents (M and $g^B$), and a signature of the message contents ($Sign_{AK}(Hash(g^B), M)$). The signature of the message contents may be created, for example, by software inside the secure enclave container 536 asking the trusted platform 530 hosting the enclave to attest to a hash of the computed $g^B$ and the enclave's identity. The trusted platform 530 may do that by providing a signature using the platform attestation key (AK) 532 to produce $Sign_{AK}(Hash(g^B), M)$. In this example, the enclave identity is a hash M of the initial state 538, but other identity statements are possible. This attestation signature $Sign_{AK}(Hash(g^B), M)$ binds the value $g^B$ to the enclave identity M and also binds both $g^B$ and M to the trusted platform 530. Enclave client 510 can then verify attestation message by verifying the attestation signature and the enclave identity. The signature may be verified as in FIG. 3 using a public key corresponding to the attestation key AK. Verifying the signature may provide an integrity guarantee of the enclave identity in the attestation message. The enclave identity can be verified by comparing the identity information in the attestation message with an independently known identity value. For example, if the identity information in the attestation message is a hash of the initial state of the enclave, enclave client 510 may know the hash of the initial state, or may be able to compute such hash from a known initial state, and this value can then be compared to the identity value provided in the attestation message.

To produce shared key SK, both enclave client 510 and code inside secure container 536 can generate $g^{AB}$ (the generator function g applied to the product of A times B) which may serve as the shared key SK. The shared key SK may be used for encrypting messages for confidentiality between enclave client 510 and the enclave, for example for sending input data to, and output data from, the code inside the enclave container 536. Note that the shared key is produced independently on each side of the communication channel in boxes 540 and 514 without either the enclave client or the enclave knowing the other's private key. For example, in the embodiment of FIG. 5, secret code and data may be securely provided by the enclave client 510 by encrypting the secret code and data with the previously established shared key SK, producing $Enc_{SK}$(secret code/data) before sending it in a message 524 to the trusted platform 530. In other embodiments, secret code and data 542 executed in or used by a secure enclave container 536 may originate from other locations. A secure computation may be performed inside the secure enclave container 536 using the secret code and/or data 542 to produce a computation result 544. Computation results 516 can then be securely communicated back to the enclave client 510 by encrypting the results with the shared key SK ($Enc_{SK}$ (results)) before sending them to the enclave client in message 526.

The process of FIG. 5 described above provides a guarantee to an enclave client that it is communicating with a "real" enclave of a certain identity, and that the enclave is protected by the enclave platform. It does not provide any guarantees to the code inside the enclave container about the entity on the other side of the communication channel. In an alternate embodiment (not depicted), such a guarantee about the enclave client can be provided by running the enclave client as an enclave itself. In this alternate embodiment, the enclave client may ask the trusted enclave platform for a signature on the hash of $g^A$, which can then be verified by the other enclave.

Attestation may be done locally or remotely. In FIG. 5, the enclave client 510 may or may not reside on the same computer as trusted platform 530, such that the communications between the enclave client 510 and trusted platform 530 may occur within a single computer (for example by passing data buffers between different processes on the same computer), or may occur over a computer network that connects enclave client 510 to trusted platform 530. Local attestation may be performed when the enclave client 510 and the trusted platform 530 are hosted on the same local computer. The artifact, or result, of local attestation is called an attestation report, and is $Sign_{AK}(Hash(g^A), M)$ in the example of FIG. 5. Remote attestation may occur when the enclave client 510 and the trusted platform 530 are hosted on different computers. The artifact, or result, of remote attestation is called an attestation quote, which in some cases may be very similar or identical to a local attestation report. In other cases an attestation quote may include an additional artifact of trust related to the computer or native platform providing the quote. Such an additional artifact of trust may include a host health certificate such as a TCG log associated with a TPM. Attestation of an enclave may be performed on any layer of an enclave's identity. An enclave may have a nested or hierarchical identity, and attestation to higher levels of identity may attest that an instantiated enclave is a member of a progressively larger group of potential enclave instantiations as the identity level increases. The higher levels may correspond to a superset of the lower level potential enclave instantiations. An example hierarchy of identities may include, from the lowest, most specific level to higher, less specific levels may be: ExactHash, InstanceHash, ImageID, FamilyID, and AuthorID.

The identity of an enclave may be derived from the binary files (the enclave binaries) loaded into the enclave's secure container. An enclave binary may be signed by its author using a private key of the author. For an ExactHash level attestation, the initial state 538 used to compute an attestation report (the input to a hash function to produce an attestation report) may include the entire contents of every binary file loaded into the secure container 536, except for binaries associated with the trusted platform 530.

Attestation at the InstanceHash identity level may include a subset of the initial state 538. The subset may be specified at the time the enclave binary files (the binary files) that are loaded into the secure container 536 were originally signed by the author of those enclave binary files. For example, a first (or primary) enclave binary file may include a list of identities of other enclave binary files upon which the first enclave binary file depends. For each identity listed, a flag may be included in the first binary file to indicate if each binary file listed is measured or not by the hash function to produce an InstanceHash attestation report.

Attestation to higher levels of an enclave ID may not include running the entire contents of any enclave binaries through a hash function. Instead, only a data structure of IDs may be run through the hash function. For example, an enclave binary file may include a list of higher-level enclave identifiers, such as universally unique identifiers (UUIDs), indicating: an image ID (ImageID) unique to that particular enclave binary file; a family ID (FamilyID) unique to a group of enclave binary files that includes that particular enclave binary file and that are authored by the same author; and an author ID (AuthorID) unique to a group of families of enclave binary files that are all authored by the same author. The ImageID, FamilyID, and AuthorID may be assigned by the author of an enclave binary at the time that the binary is originally signed. Spoofing of enclave identities can be prevented where the enclave client can access the enclave binaries and verify the author's signature on those binaries using the author's public key (or a public key associated with the author). This verifies integrity of the enclave binaries, including any higher level identities assigned by the author, as having been created by that enclave author.

Figure 6:
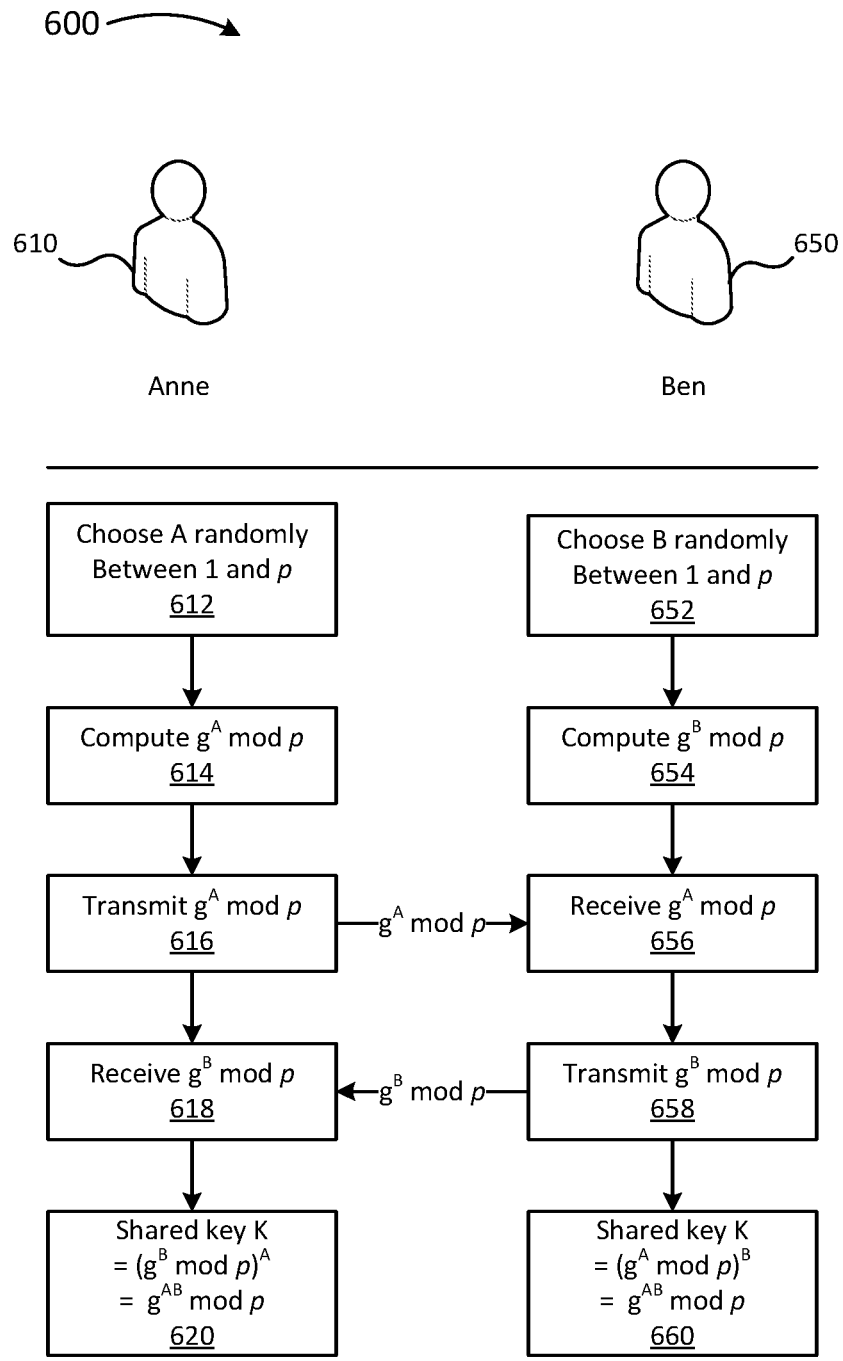
FIG. 6 depicts an example Diffe-Hellman Key Exchange (DKE) protocol.

FIG. 6 depicts an example Diffie-Hellman Key Exchange (DKE) protocol 600. DKE is one example process for establishing a shared key K across a communication channel having only an integrity guarantee; other processes for creating shared keys known in the art of digital cryptography may be used. In the DKE example of FIG. 6, a secret key K is shared between Anne 610 and Ben 650 without ever communicating K explicitly over a public (unsecured) communication medium between Anne 610 and Ben 650. Before the process starts, 1) a large prime number p and 2) a generator g in Zp may be established and known by both Anne and Ben. The process then starts with both Anne and Ben choosing a random number between 1 and p. Anne's random number is A, chosen in box 612, and Ben's random number is B, chosen in box 652. Anne uses her random number to compute $g^A$ mod p in box 614, and transmits that quantity in box 616 which is received by Ben in box 656. Ben uses his random number to computer $g^B$ mod p in box 654, which is transmitted in box 656 to Anne and received in box 618. Anne can produce the shared key K as $(g^B \bmod p)^A = g^{AB}$ mod p in box 620 and Ben can produce the shared key K as $(g^A \bmod p)^B = g^{AB}$ mod p in box 660. In order to prevent man-in-the-middle attacks, the communication between Anne and Ben over an unprotected network from boxes 616 and 658 may include a message integrity guarantee, for example created using a process such as that of FIG. 3.

Figure 7:
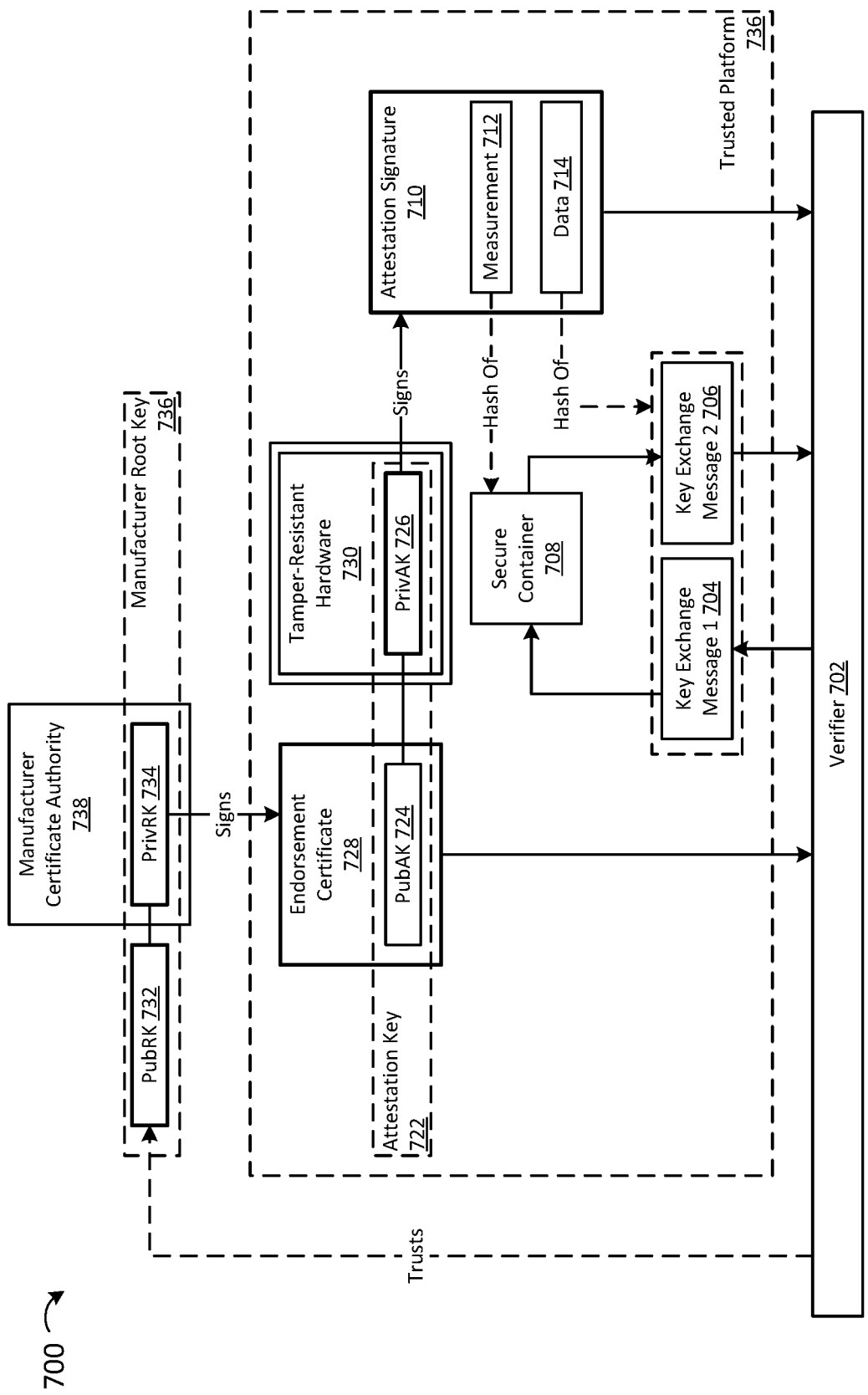
FIG. 7 depicts an example chain of trust for software attestation.

FIG. 7 depicts an example chain of trust 700 for software attestation. The chain of trust in software attestation may be rooted in a signing key owned by the manufacturer of the trusted platform, such as the trusted platform 530 of FIG. 5. The trusted platform may include hardware components such as a secure processor or a hardware security module (HSM), and thus the manufacturer may be a provider of computer hardware and may also provide software for the trusted platform. The manufacturer may be trusted by the verifier 702, and the verifier may know the public key PubRK 732 of the manufacturer root key 736. The enclave client 510 of FIG. 5 is an example of a verifier 702 that may wish to have assurances about a secure container 708. The manufacturer may act as a certificate authority and provide each instance of trusted platform that it produces, for example each secure processor, with a unique attestation key 722, which is used to produce attestation signatures. The manufacturer also issues an endorsement certificate 728 for each attestation key 722. The manufacturer root key 736 includes a private key PrivRK 734 that is used to sign the endorsement certificate 728. The signing of the endorsement certificate provides an integrity guarantee, for example as shown in FIG. 3.

The endorsement certificate 728 includes the attestation key's 722 public key PubAK 724. The endorsement certificate 728 may indicate that the attestation key 722 is to be used for software attestation, and may be communicated to the verifier 702. The verifier may be any entity wishing to verify an attestation of the secure container 708, for example verifier 702 may be enclave client 510 of FIG. 5 that wishes a secure computation be done inside secure container 708. The verifier 702 may inspect the endorsement certificate using the PubRK 732 to verify the integrity and origin of the endorsement certificate. The verifier may also extract the PubAK 724 from the endorsement certificate. The endorsement certificate may be associated with a certification policy, which may require that the attestation key 722 is used only to produce attestation signatures and that the attestation key's 722 private key PrivAK 726 be kept exclusively in storage that is separate from the generally accessible computer memory of the trusted platform, such as in the storage of tamper-resistant hardware 730. Tamper-resistant hardware may be, for example, hardware conforming to a Trusted Platform Module (TPM) standard.

A secure container 708 may be instantiated on trusted platform 736. Instantiation of secure container 708 may include defining an isolated memory space for the secure container that is restricted from access by unsecured processing. Unsecure processing may include, for example, access from outside the trusted platform but on the computer hosting the trusted platform, or access from within other secure containers inside the trusted platform. Instantiation of secure container 708 may also include loading public code and data into the secure container, for example the initial state 535 of FIG. 5.

The instantiated secure container 708 can exchange keys with verifier 702 to establish a shared key for confidential communication. The key exchange process may be the key exchange process of FIG. 5 or the DKE process of FIG. 6. The verifier sends key exchange message 1 704 to the trusted platform 736, for example as in box 616 of FIG. 6, and the trusted platform 736 sends key exchange message 2 706 back to the verifier 702, for example as in box 658 of FIG. 6.

Attestation signature 710 may be created after the secure container 708 is instantiated and the key exchange is completed. The instantiated secure container 708 can be measured by running a cryptographic hash function on all or part of the secure container. This may include running the hash function over the contents of the isolated memory, and binary files that are loaded into the isolated memory, any other memory associated with the trusted platform that is used or affected during the instantiation of the secure container, or any subset or portion of these. The output of running this hash function is measurement 712, which is part of the attestation signature 710. A cryptographic hash of the key exchanges messages 704 and 706 may also be included with the attestation signature 710, depicted as data 714. The measurement 712 and data 714 can be signed using the attestation private key PrivAK 726. The attestation signature can then be sent to verifier 702 along with measurement 712 and data 714. The verifier can verify the integrity of the attestation signature using the PubAK 724 from the endorsement certificate, which, in the example of FIG. 7, also allows verification of the integrity of the measurement 712 and data 714. The verifier 702 can verify integrity of secure container 708 by comparing measurement 712 against an expected result (the expected result determined, for example, by locally performing the same hash of the measurement 712), and verify that the attestation signature was created for this particular verifier 702 communication path instance by inspecting data 714 (for example because the hash of data 714 is tied to the key exchange message 2 706). After these verification operations and verification of the endorsement certificate above, the verifier now has some assurance that it can establish communications having both confidentiality and integrity with the secure container 708 using an established shared key, that the trusted platform hardware can be trusted according to its manufacturer, and that the software state of the trusted platform used to create the secure container is known. The verifier 702 is now ready to request secure processing within the secure container 708 using private code and/or private data.

Enclave Abstraction Platform and Primitives

Figure 8:
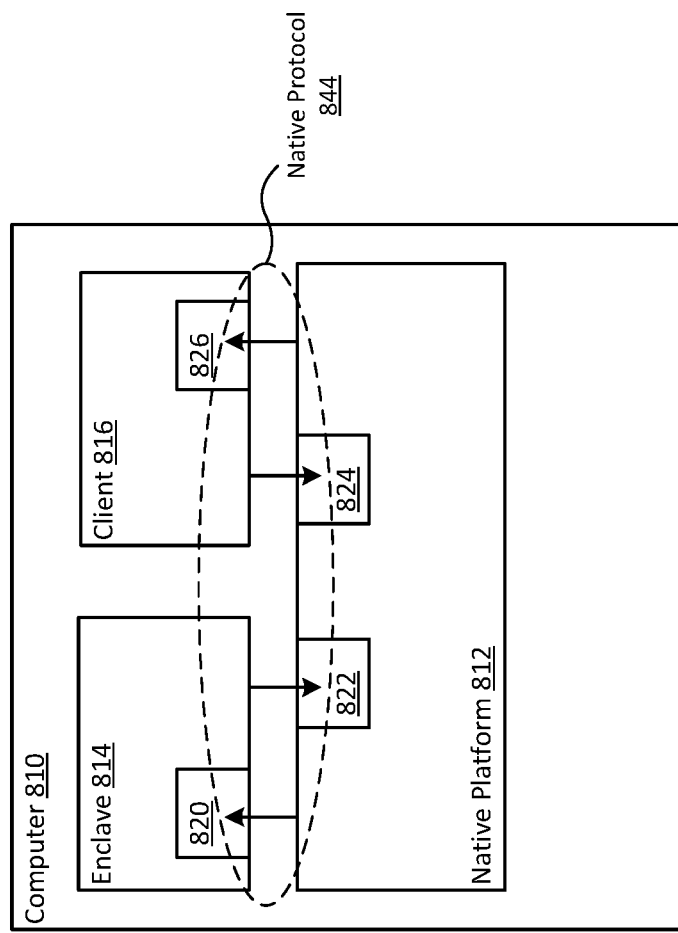
FIG. 8 is a block diagram of software component interfaces for an example local enclave system.

FIG. 8 is a block diagram of software component interfaces for an example local enclave system. Enclave system 800 includes a computer 810 with native enclave platform 812 hosting enclave 814 and a client 816 of the enclave. The native platform 812 may be a hardware and/or software component based on, for example, Intel's SGX or Microsoft's VSM. Enclave 810 may be enclave 176 of FIG. 1. A native protocol 844 for enclaves may be used for communication between the enclave 814, the client 816, and the native platform 812. As depicted in FIG. 8, the native protocol 844 includes interface 820 in the enclave 814, interfaces 822 and 824 in the native platform, and interface 826 in the client. These interfaces may be APIs or ABIs in software components.

Use of these software interfaces 820, 822, 824, and 826 may include an execution control transfer between software components. A control transfer may include executing a call or jump instruction to an entry point (an address of an instruction) in the software component that control is being transfer to. For example, if the native platform 812 is a software component, control transfer from native platform 812 to client 816 may occur via software interface 826 when a call or jump instruction in the native platform 812 is executed specifying an address within client 816 to call or jump to. The specified address inside the client 816 may be an entry point for a function or method in interface 816. Control transfer is indicated as an arrow in FIG. 8, for example: from native platform 812 to enclave 814 via interface 820; from enclave 814 to native platform 812 via interface 822; from client 816 to native platform 812 via interface 824, and from native platform 812 to client 816 via interface 826. A native protocol 844 may include patterns of communication via interfaces 820, 822, 824, and 826.

In some embodiments, the native platform 812 may be implemented at least in part as a hardware component, for example with special processor instructions for managing an enclave. Such a special hardware instruction may be executed as part of a native platform 812 software component. In alternate embodiments there may be no software component for some or all of the functions of the native platform 812. In these alternate embodiments, native platform interfaces 822 and 824 may be hardware instructions instead of software entry points, so a function of the native platform 812 may be used by enclave 814 or client 816 or may be used by executing a special hardware instruction instead in the enclave 814 or client 816, respectively, instead of executing a call or jump instruction.

In some embodiments, client 816 of enclave 814 may itself be an enclave. For example, an enclave client 816 may use interface 824 to request that enclave 814 be created. In these embodiments, communication between enclave 814 and client 816 through native platform 812 is actually communication between two enclaves. When client 816 is also an enclave, enclave client 816 may also use interface 822 and expose an interface similar to 820 (not depicted).

Figure 9:
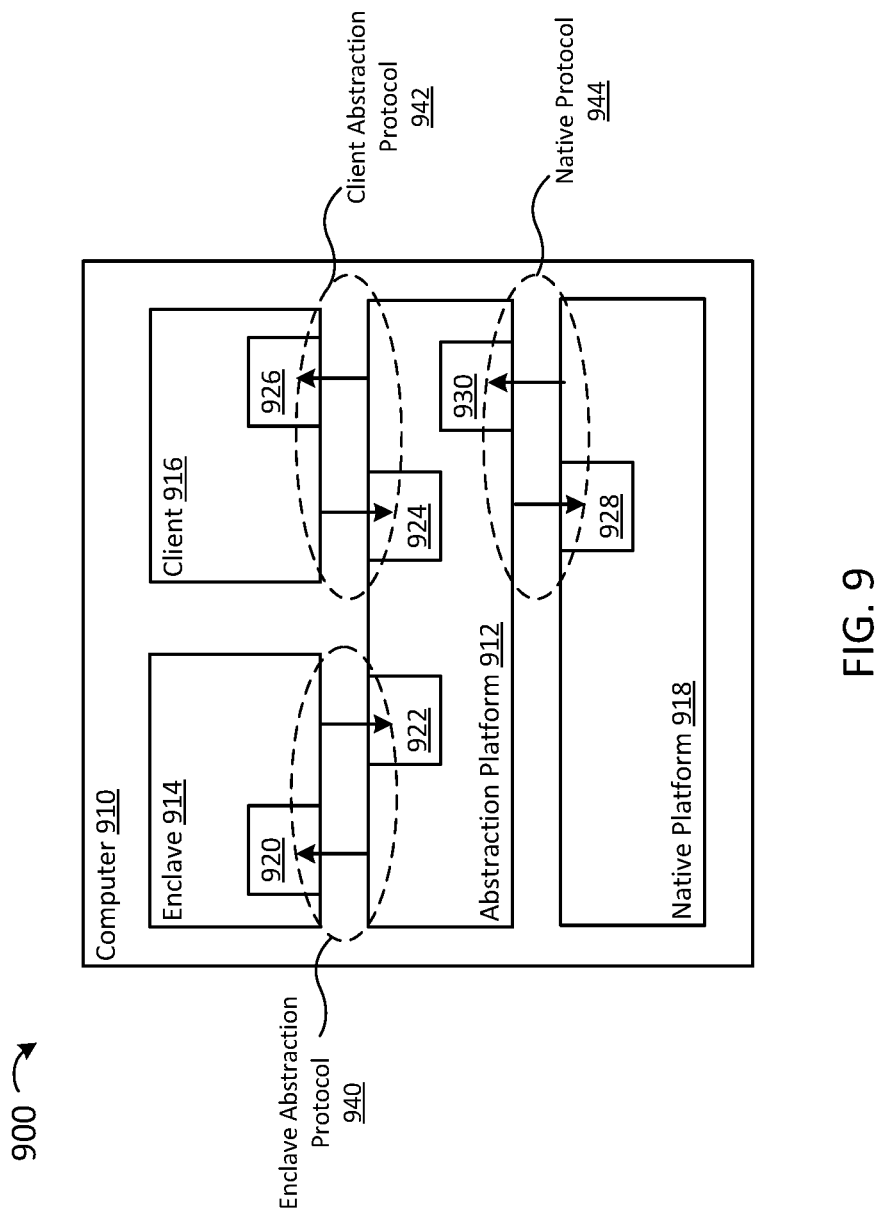
FIG. 9 is a block diagram of software component interfaces for an example local enclave system with an abstraction layer.

FIG. 9 is a block diagram of software component interfaces for an example local enclave system with an abstraction layer. Enclave system 900 includes an abstraction platform 912 for translating between native protocol 944 and abstraction protocols 940, 942. Native platform 918 may be similar to abstraction platform 812 of FIG. 8, and interfaces 928 and 930 may combine the functions of interfaces 820, 822, 824, and 825 of FIG. 8. Enclave abstraction protocol 940 includes interfaces 920, 922 for enclave 914, while client abstraction protocol 942 includes interfaces 924, 926 for client 916. As in FIG. 8, client 916 running on computer 910 may request the creation of enclave 914 via interface 924. Abstraction layer 912 may cause the creation of enclave 914 using native protocol 944 and interfaces 928, 930 with native platform 918. Client 916 and enclave 914 may use abstraction protocols 940 and 942 when native platform 918 and native protocol 944 is based on different enclave architectures, such as Intel SGX or Microsoft VSM. As in FIG. 8, the client 916 of enclave 914 may itself be an enclave, and native platform 918 may include hardware and/or software components.

Enclave 914 and client 916 may not communicate directly and may instead only communicate via abstraction platform 912. Direct communication may not be possible or desirable, for example due to the isolation of the enclave 914 memory. Enclave memory isolation may prevent reading from, writing to, or executing (jumping into or out of) the enclave's isolated memory.

Enclave 914 may include instructions located inside an enclave secure container of computer 910. Client 916 may include instructions located in the memory address space of computer 910, but outside the secure container of enclave 914. Abstraction platform 912 may be implemented in various ways, including as instructions that are inside or outside the secure container of enclave 914, and may also include instructions executed from within hypercalls. In the case where abstraction platform 912 is included at least in part within the secure container of enclave 914, the abstraction platform code inside the secure container may be authored separately from the remainder of the enclave 914's code and may only interact with other enclave code via public APIs/ABIs. Such abstraction platform code may be statically linked or dynamically linked to the remainder of the code inside the enclave secure container. Statically linked abstraction platform code may be object code that is associated with abstraction platform and is included (statically linked), along with code that is more specific to enclave 914, into a binary image from which enclave 914 may be instantiated. In the case of a dynamically linked abstraction platform, the enclave code that is more specific to enclave 914 and the code associated more generally with the abstraction platform may be sourced from separate binary images. For a dynamically linked example, see FIG. 14.

Figure 10:
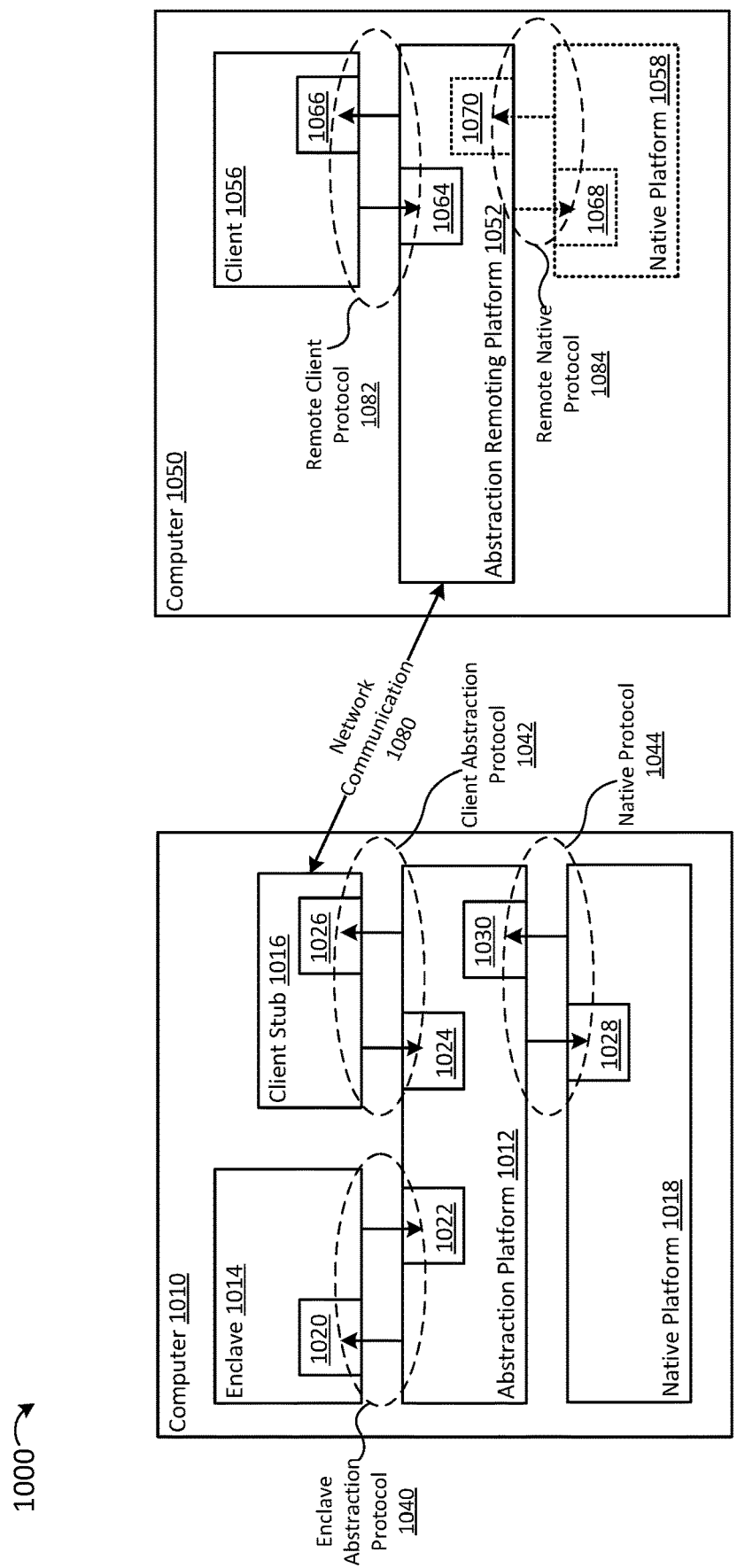
FIG. 10 is a block diagram of software component interfaces for an example remote enclave system with an abstraction layer.

FIG. 10 is a block diagram of software component interfaces for an example remote enclave system with an abstraction layer. Remote enclave system 1000 includes an enclave 1014 on computer 1010, and a client 1056 of enclave 1014 on a separate computer 1050. The combination of client stub 1016 and abstraction remoting platform 1052 may facilitate interaction between enclave 1014 and client 1056. Many elements in computer 1010 may be identical or similar to the identically named elements of computer 910 of FIG. 9. In particular, abstraction platform 1012, protocols 1040, 1042, 1044, and native platform 1018 may be similar or identical to corresponding elements 912, 940, 942, 944, and 918, respectively.

Client stub 1016 may communicate with abstraction remoting platform 1052 via network communication 1080. Remote client protocol 1082 and interfaces 1064, 1066 may be similar to client abstraction protocol 1042 and interfaces 1024, 1026. However remote client protocol may include additional functionality for remoting. For example, a method in interface 1064 such as CreateEnclave to request creation of an enclave may additionally include the ability to specify an enclave host computer, such as computer 1010, where an enclave is requested to be created. An attestation quote of enclave 1014 provided to client 1056 via remote client protocol may be provided instead of, or in addition to, an attestation report. Computer 1050 with client 1056 may or may not include a native enclave platform 1058. If native platform 1058 is present, it may or may not conform to the sample enclave architecture native platform 1018, and hence native protocol 1044 and remote native protocol 1084 may not be the same.

In an alternate embodiment (not depicted), client stub 1016 may not exist, and abstraction platform 1012 may communicate directly with abstraction remoting platform 1052 over a network.

Enclave abstraction protocols, such as 940, 942, 1040, 1042, 1082 of FIGS. 9 and 10, may include a variety of interface methods or entry points to manage and use enclaves that are built on multiple native platforms, such as Intel SGX and Microsoft VSM. These methods may provide enclave primitives that can be implemented on the multiple native platforms, hence providing an "abstraction" of the native platforms. Enclave primitives disclosed here include enclave lifecycle management, attestation, data sealing, control transfer, monotonic counters, and trusted time.

Primitives for enclave lifecycle management may include methods for causing the instantiation or termination of an enclave such as enclave 914. Lifecycle management primitives may be a part of client abstraction protocol 942, and, more specifically, may be implemented by abstraction platform 912 as part of interface 924 for use by client 916.

A method for instantiating or creating an enclave may include specifying an executable image of the code and/or data to be loaded into the secure enclave container's isolated memory. This code, before or after it is loaded into the enclave container, may become part of the initial state used for attestation of the instantiated enclave (as explained above with regard to FIG. 5). For example, an enclave's executable image (an enclave binary) may be specified by an enclave client by providing a pointer to a buffer in memory containing the executable image. Alternately, an enclave image may be specified by indicating a file in a file system containing the enclave binary. In some embodiments, the specified enclave image may be encrypted; in other embodiments, the enclave may not be encrypted; in other embodiments, the enclave may be partially encrypted. The measurement of the enclave binary for attestation may occur over an encrypted executable image or after decryption.

The code and/or data to be loaded initially into an enclave may be indicated by specifying a file containing an enclave primary image. In addition to this code and/or data, an enclave primary image may include additional metadata, such as a desired size of the enclave (the amount of memory required inside the enclave container), locations of entry points within the code in the file, and a list of dependent image files. Dependent image files are other (non-primary) image files that may also be loaded into the enclave along with the code and data in the primary image file. Dependent image files may themselves contain lists of further dependent image files. In the case of the local enclave system of FIG. 9, the primary and dependent images may be filed in any accessible storage device, such as via a locally accessible file system. In the case of the remote enclave system of FIG. 10, the primary image file may be in any storage device accessible to either computer 1010 or computer 1050. If client 1056 requests creation of an enclave on computer 1010 using a primary image located on computer 1050, abstraction remoting platform and client stub 1016 may coordinate to copy the specified primary image file to computer 1010.

CreateEnclave is an example method for instantiating an enclave. The CreateEnclave method may be described with pseudocode:

```
HANDLE
CreateEnclave(
    _In_                    PCWSTR      enclavePath,
    _In_                    DWORD       flEnclaveType,
    _In_                    DWORD       dwFlags,
    _In_reads_bytes_(dwInfoLength)
                            PCVOID      enclaveInformation,
    _In_                    DWORD       dwInfoLength,
    _Out_opt_               PDWORD      enclaveError
)
```

The pseudocode used to describe methods herein may use several pseudocode conventions for defining API interfaces. For example, function parameters, such as enclavePath above, may be decorated with "_In_" or "_Out_" to indicate that a parameter is an input or output parameter, respectively. "_Out_opt_" may indicate an optional output parameter. All-caps words may indicate a data type. HANDLE may be number, such as a 32-bit number, used to indirectly refer to something. For example, the CreateEnclave method above returns a HANDLE to the caller of CreateEnclave, and that HANDLE may be a handle of the enclave that was created; PCWSTR may be a pointer to a certain type of text string; DWORD may be unsigned 32-bit quantity; PCVOID may be a pointer to data of unspecified type; BOOL may be a binary value.

CreateEnclave may allow a client, such as client 916, to create an enclave and load the primary image within the enclave. Any enclave configuration information in this image may be associated with the instantiated enclave. CreateEnclave may include the following parameters:

lpEnclaveName: may specify the path to the enclave primary image, which in implementations may be some other type of identifier for identifying the code and/or data of the enclave primary image, such as a handle to an opened file, a uniform resource identifier (URI), or an identifier that is used in an external lookup. For example, a globally unique identifier (GUID) may be used as a key into a database of primary images. In other implementations, this parameter may identity a memory region that contains the enclave primary image.

flEnclaveType: may specify the type of enclave to create (in case an enclave image supports multiple types). May be set to DEFAULT in case the binary supports only one enclave or the developer has explicitly specified a default. dwFlags: may specify one or more predetermined actions to be taken when creating enclaves and loading the enclave primary image.

enclaveInformation: may be an optional input parameters for runtime configuration of enclave.

lpEnclaveError: may specify an optional parameter to return an architecture specific error code.

Upon successful completion, CreateEnclave may return a handle to the enclave. Upon error, NULL may be returned. Other identifiers (GUID, URI, etc.) may also be returned without departing from the scope of this disclosure. For simplicity, this specification will describe the APIs using a handle. Enclave creation may fail, for example, due to lack of enclave memory, lack of support for the specified enclave type in the abstraction platform or native platform, or creation may fail due to explicit configuration policies preventing an enclave of a specified type from running on the system.

Implementations of CreateEnclave and other API method described below may exclude one or more of the method parameters described. For example, regarding CreateEnclave, the lpEnclaveName, flEnclaveType, dwFlags, and enclaveInformation may be excluded, using a specific predetermined value for that particular API. The lpEnclaveError argument may also be excluded from the API, and alternative methods to check for errors in the API call may be optionally implemented.

CreateEnclave may be responsible for loading all dependent modules as specified in the enclave primary image. The enclave primary image may be a portable execution (PE) file which specifies other binary image files upon which the primary image depends. CreateEnclave may also perform native platform specific initialization, such as finalizing measurements for attestation, allocating structures for transport layer security (TLS) and/or other key agreement and communication protocols, etc. Enclave abstraction protocol interfaces 920, 922 (including methods, for example, for data sealing and attestation) may be operable once enclave initialization has completed.

TerminateEnclave is an example method for terminating an enclave:

```
VOID
TerminateEnclave(
    _In_    HANDLE    hEnclave
)
```

TerminateEnclave may be used to destroy an enclave. In implementations, destroying an enclave may include forcing all enclave threads to return to the host or terminate, and/or freeing up memory associated with the enclave. Calling TerminateEnclave on a running enclave may terminate it and release all resources associated with the enclave.

Enclave abstraction platform 912 may include execution control transfer primitives which may be used, for example, to transfer control between an enclave and its client. Execution control transfer primitives may enable communication between enclave 914 and client 916 by starting the execution of code at an entry point in the other component. Execution control transfer primitives allow passing of data into/out of enclaves by allowing parameters to be associated with a control transfer request; the parameters may specify individual data items (the parameters themselves are communicated) or the parameters may be pointers to memory areas (buffers pointed to by the parameters are communicated). These primitives may enable control transfer despite limitations on directly calling or jumping between enclave 914 and client 916 due to the security restrictions on the enclave container.

For calling into an enclave, interface 924 may include mechanisms to allow a client 916 to call into an enclave 914 via interface 920. For example, interface 924 may include GetProcAddress and CallEnclave methods:

```
typedef PVOID (*ENCPROC)(PVOID);
ENCPROC
GetProcAddress(
    _In_    HMODULE    hEnclave,
    _In_    LPCTSTR    lpProcName
)
BOOL
CallEnclaveIn(
    _In_    ENCPROC    pCallin,
    _In_    PVOID      pParameter,
    _Out_   PVOID      pReturn
)
```

An enclave client, such as client 916, can call into an enclave, such as enclave 914, using the function pointer returned by GetProcAddress( ) The lpProcName parameter may match the function exported in the enclave primary image. For example:

```
// Call Callin function for enclave.
ENCPROC pCallin = (ENCPROC) GetProcAddress(hEnclave,
"CallinExample");
PVOID pParameter; // Pointer to memory
if (NULL != pCallin)
{
    CallEnclaveIn(pCallin, pParameter);
}
```

In other embodiments of GetProcAddress, lpProcName may be another identifier of the specific exported function, such as a number, such as a selection from an enumeration of entry points exported from an enclave image, or other non-textual identifier corresponding to the function. Other embodiments of CallEnclaveIn may additionally take an input parameter specifying the enclave to be called into, for example, the handle returned CreateEnclave.

When calling into an enclave, a thread in the client process may be suspended and an enclave thread (with separate thread ID) may be used to service the call in request. The enclave code, running on the enclave thread, may then have access to memory that was previously available to the enclave client before calling into the enclave. For example, the client may put data into the buffer pointed to by pParameter before calling the CallEnclaveIn abstraction method, and then the enclave may have access to the buffer pointed to by pParameter while servicing the call in request. Upon call out, the original (client) calling thread may be used to service the call out. Reentrancy may be supported (for example a call out in host can call into the enclave again).

For calling out of an enclave, the interface 922 may include methods related to the CallEnclaveIn methods above that allow an enclave 914 to call out to the enclave client 916. For example, the enclave 914 may callout to any function in the host process of a particular type, for example the ENCPROC function type. The function pointer for the same can be passed using the call in parameters to the enclave.

```
BOOL
CallEnclaveOut(
    _In_         ENCPROC      pCallout,
    _In_         PVOID        pParameter,
    _Out_        PVOID        pReturn
)
// Call out to function in host process
ENCPROC pCallout = (ENCPROC) 0xF00; // address to some function in host
PVOID pParameter = // Pointer to memory
CallEnclaveOut(pCallout, pSharedMemory);
```

The interface 920 may include the entry points registered as the "CallinExample" function above, and the interface 926 may include the entry points registered as "Callout" functions above. For example, in the case where an enclave primary image is in a portable executable (PE) image format, the function entry points in the image may be listed as "export" entry points, and each such exported entry point may include a textual name, such as "CallinExample," to identify and differentiate the entry points in that enclave PE image; in other implementations the function entry points may be marked with additional metadata, such as one bit indicating that a function may be an entry point for the enclave. In the example above for calling out of the enclave, the address of callout function is given as 0xF00 and is only an example. The actual address of a callout function can be determined in a variety of ways. For example, a callout function address inside a client may be passed into the enclave as a parameter for a call-in function. In another example, the address of a callout function may be registered by the client using a function such as RegisterCallOut:

```
BOOL RegisterCallOut(
    _In_         ENCPROC      pCallout,
    _In_         LPCTSTR      lpProcName)
```

Code inside the enclave may obtain the address of the callout function by calling a complementary function such as GetCallOut:

```
BOOL GetCallOut(
    _Out_        ENCPROC      *pCallout,
    _In_         LPCTSTR      lpProcName)
```

In other embodiments, the CallEnclaveIn and CallEnclaveOut methods may actually be the same method. For example, a single CallEnclave method may be used to call into and to call out of an enclave. In situations where enclave client 916 is also an enclave, calling out of enclave 914 to client 916 will also be calling into an enclave.

Abstraction platform 912 may provide primitives for sealing data to an enclave. For example, the interface 922 may provide services to the enclave 914, such as sealing and unsealing data to an enclave identity. As explained above, an enclave may have multiple nested identities, and data may be sealed to any such identity. When data is sealed to an identity that corresponds to a set of possible enclave instantiations, the sealed data may be unsealed by any of that corresponding set of enclave instantiations. For example:

```
struct SEALING_POLICY
{
    ENCLAVE_ID_TYPE    enclaveIdType;
};
```

For each value of enclaveIdType, the enclave will seal to a mapping ID. Possible enclave identity types (and values of enclaveIdType) include:

```
ENCLAVE_EXACTHASH
ENCLAVE_INSTANCEHASH:   // seal using MRENCLAVE for SGX, IMAGE HASH for VSM
ENCLAVE_IMAGEIDS:       // not supported in SGX, will use IMAGE IDS for VSM
ENCLAVE_FAMILYID:       // will use PRODUCTID for SGX, FAMILY ID for VSM
ENCLAVE_AUTHORID:       // will use MRSIGNER for SGX, AUTHOR ID for VSM
```

The platform may also apply additional debug configuration (authored and runtime) to the sealing policy. For different debug policies, different sealing keys may be used. For example, debug and release configurations may use different sealing keys.

```
DWORD
EnclaveSeal(
    _In_                              SEALING_POLICY sealingPolicy,
    _In_reads_bytes_opt_(dwPlaintextSize)    LPCVOID  pPlaintext,
    _In_                              DWORD    dwPlaintextSize,
    _In_reads_bytes_opt_(dwAuthdataSize)     LPCVOID  pAuthdata,
    _In_                              DWORD    dwAuthdataSize,
```

```
    _Out_writes_bytes_to_(dwSealedtextSize) LPVOID pSealedtext,
    _Inout_                                 DWORD    *dwSealedtextSize
)
DWORD
EnclaveUnseal(
    _In_reads_bytes_opt_(dwSealedtextSize) LPCVOID pSealedtext,
    _In_                                   DWORD   dwSealedtextSize,
    _In_reads_bytes_opt_(dwAuthdataSize)   LPCVOID pAuthdata,
    _In_                                   DWORD   dwAuthdataSize,
    _Out_writes_bytes_to_(dwPlaintextSize) LPCVOID pPlaintext,
    _Inout_                                DWORD   *dwPlaintextSize
)
```

Abstraction platform 912 may provide primitives for attestation, such as for producing attestation reports and quotes, and for verifying reports and quotes. For example:

```
DWORD
CreateReport(
    _In_reads_bytes_opt_(dwTargetInfoSize) PCVOID  pTargetInfo,
    _In_                                   DWORD   dwTargetInfoSize,
    _In_reads_bytes_opt_(dwAuthData)       PCVOID  pAuthData,
    _In_                                   DWORD   dwAuthData,
    _Out_writes_bytes_opt_(*pReportSize)   PVOID   pReport,
    _Inout_                                PDWORD  pReportSize,
    _Out_opt_                              PDWORD  lpEnclaveError
)
DWORD
VerifyReport(
    _In_reads_bytes_(dwReportSize)         PCVOID   pReport,
    _In_                                   DWORD    dwReportSize,
    _Out_opt_                              LPDWORD  lpEnclaveError
)
```

VerifyReport( ) may be used by an enclave to affirm the integrity of the report and that the report was generated by an enclave on the same machine.

```
DWORD CreateQuote(
    _In_                                   GUID    quoteType,
    _In_                                   DWORD   authDataSize,
    _In_reads_bytes_opt_(authDataSize)     const   BYTE* authData,
    _Out_                                  DWORD*  quoteSize,
    _Outptr_result_bytebuffer_opt_(*quoteSize) BYTE** quote
)
```

In CreateQuote, quoteType may map to a quote provider, which may be a source of trust to generate the specific quote. In CreateQuote, authData may be a pointer to data that is created by, and in a format defined by, the caller of CreateQuote. Note authData need not be understood by the abstraction platform 912. The authData may be packed into the resulting quote. Quote providers may be expected to support this.

```
DWORD VerifyQuote(
    _In_                                   DWORD   quoteSize,
    _In_reads_bytes_(quoteSize) const      BYTE*   quote,
    _Out_                                  DWORD*  reportSize,
    _Outptr_result_bytebuffer_all_(*reportSize) BYTE** report
)
```

In addition to the enclave primitives described above, an enclave abstraction platform may provide: memory management (for example to allocate and free memory, such as memory restricted to an enclave or memory that is shared between an enclave and its client); exception handling (for example to handle error, or exceptions, that occur while executing enclave code); thread synchronization; and cryptographic functions (for example encryption, hash functions, and signing).

Figure 11:
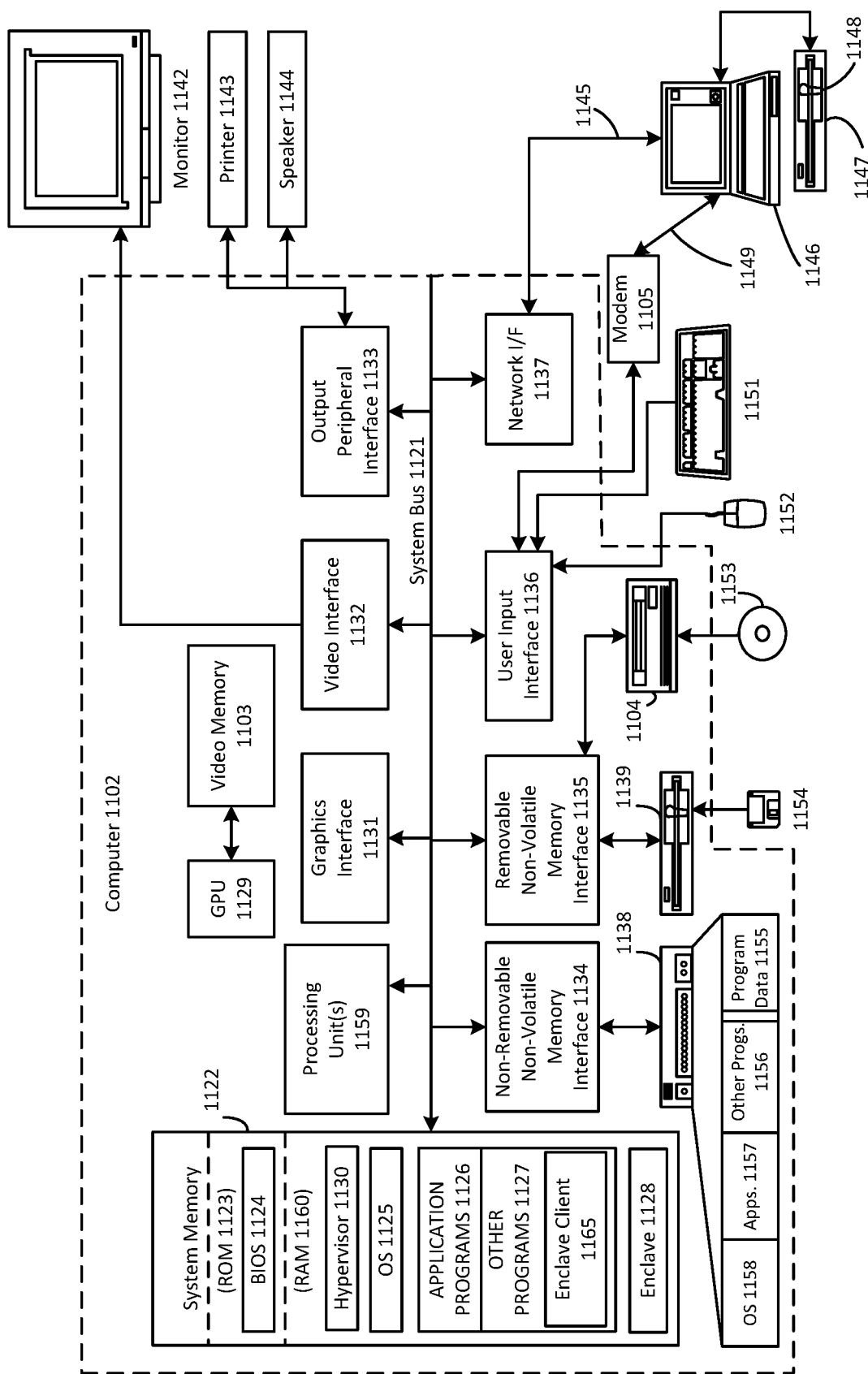
FIG. 11 depicts an example general purpose computing environment.

The techniques described above may be implemented on one or more computing devices or environments, as described below. FIG. 11 depicts an example general purpose computing environment, for example, that may embody one or more of trusted hardware 172, trusted platform 736, or computers 810, 910, 1010, and 1050, in which some of the techniques described herein may be embodied. The computing system environment 1102 is only one example of a suitable computing environment and is not intended to suggest any limitation as to the scope of use or functionality of the presently disclosed subject matter. Neither should the computing environment 1102 be interpreted as having any dependency or requirement relating to any one or combination of components illustrated in the example operating environment 1102. In some embodiments the various depicted computing elements may include circuitry configured to instantiate specific aspects of the present disclosure. For example, the term circuitry used in the disclosure can include specialized hardware components configured to perform function(s) by firmware or switches.

In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 1102, which may include any of a mobile device or smart phone, tablet, laptop, desktop computer, or collection of networked devices, cloud computing resources, etc., typically includes a variety of computer-readable media. Computer-readable media can be any available media that can be accessed by computer 1102 and includes both volatile and nonvolatile media, removable and non-removable media. The system memory 1122 includes computer-readable storage media in the form of volatile and/or nonvolatile memory such as read only memory (ROM) 1123 and random access memory (RAM) 1160. A basic input/output system 1124 (BIOS), containing the basic routines that help to transfer information between elements within computer 1102, such as during start-up, is typically stored in ROM 1123. RAM 1160 typically contains data and/or program modules that are immediately accessible to and/or presently being operated on by processing unit 1159. By way of example, and not limitation, FIG. 11 illustrates hypervisor 1130, operating system (OS) 1125, application programs 1126, other program modules 1127 including an enclave client 1165, and enclave 1128.

The computer 1102 may also include other removable/non-removable, volatile/nonvolatile computer storage media. By way of example only, FIG. 11 illustrates a hard disk drive 1138 that reads from or writes to non-removable, nonvolatile magnetic media, a magnetic disk drive 1139 that reads from or writes to a removable, nonvolatile magnetic disk 1154, and an optical disk drive 1104 that reads from or writes to a removable, nonvolatile optical disk 1153 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1138 is typically connected to the system bus 1121 through a non-removable memory interface such as interface 1134, and magnetic disk drive 1139 and optical disk drive 1104 are typically connected to the system bus 1121 by a removable memory interface, such as interface 1135 or 1136.

The drives and their associated computer storage media discussed above and illustrated in FIG. 11 provide storage of computer-readable instructions, data structures, program modules and other data for the computer 1102. In FIG. 11, for example, hard disk drive 1138 is illustrated as storing operating system 1158, application programs 1157, other program modules 1156, such as enclave client applications and enclave binary files, and program data 1155. Note that these components can either be the same as or different from operating system 1125, application programs 1126, other program modules 1127, and program data 1128. Operating system 1158, application programs 1157, other program modules 1156, and program data 1155 are given different numbers here to illustrate that, at a minimum, they are different copies. A user may enter commands and information into the computer 1102 through input devices such as a keyboard 1151 and pointing device 1152, commonly referred to as a mouse, trackball or touch pad. Other input devices (not shown) may include a microphone, joystick, game pad, satellite dish, scanner, retinal scanner, or the like. These and other input devices are often connected to the processing unit 1159 through a user input interface 1136 that is coupled to the system bus 1121, but may be connected by other interface and bus structures, such as a parallel port, game port or a universal serial bus (USB). A monitor 1142 or other type of display device is also connected to the system bus 1121 via an interface, such as a video interface 1132. In addition to the monitor, computers may also include other peripheral output devices such as speakers 1144 and printer 1143, which may be connected through an output peripheral interface 1133.

The computer 1102 may operate in a networked environment using logical connections to one or more remote computers, such as a remote computer 1146. The remote computer 1146 may be a personal computer, a server, a router, a network PC, a peer device or other common network node, and typically includes many or all of the elements described above relative to the computer 1102, although only a memory storage device 1147 has been illustrated in FIG. 11. The logical connections depicted in FIG. 11 include a local area network (LAN) 1145 and a wide area network (WAN) 1149, but may also include other networks. Such networking environments are commonplace in offices, enterprise-wide computer networks, intranets, the Internet, and cloud computing resources.

When used in a LAN networking environment, the computer 1102 is connected to the LAN 1145 through a network interface or adapter 1137. When used in a WAN networking environment, the computer 1102 typically includes a modem 1105 or other means for establishing communications over the WAN 1149, such as the Internet. The modem 1105, which may be internal or external, may be connected to the system bus 1121 via the user input interface 1136, or other appropriate mechanism. In a networked environment, program modules depicted relative to the computer 1102, or portions thereof, may be stored in the remote memory storage device. By way of example, and not limitation, FIG. 11 illustrates remote application programs 1148 as residing on memory device 1147. It will be appreciated that the network connections shown are example and other means of establishing a communications link between the computers may be used.

Figure 12:
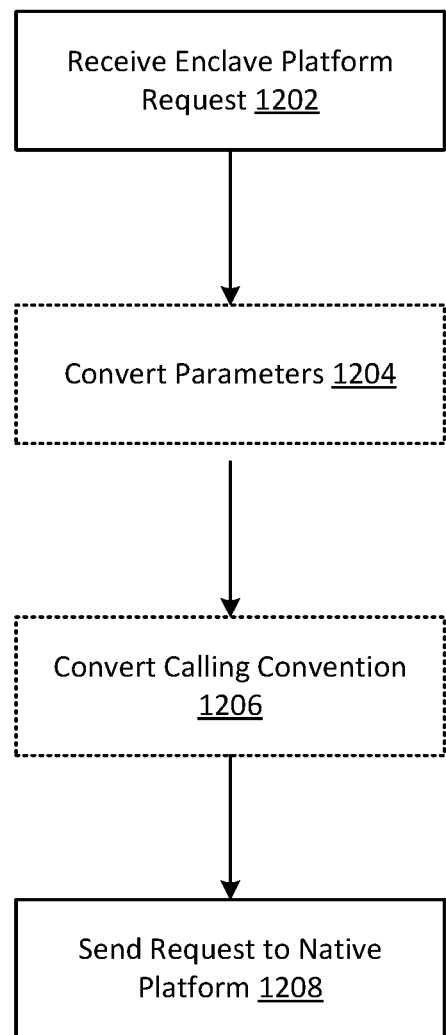
FIG. 12 depicts an example flowchart for a method of abstracting a native enclave platform.

FIG. 12 depicts an example flowchart for a method 1200 of abstracting a native enclave platform. An abstraction platform, such as 912 of FIG. 9, may receive a request for an enclave platform in box 1202. The request may come from an enclave client, such client 914, or from an enclave, such as enclave 916.

A request from an enclave may be a request to perform an abstraction platform primitive and may include, for example, a request to: create an attestation report or quote of an enclave; seal data to the enclave; call a function in the client of an enclave (call out to the client); read a monotonic counter (provide the current value of a monotonic counter);

provide a trusted time measurement; and allocate memory that can be shared between an enclave and its client (for example, to allow a pointer to shared memory to be passed as a parameter when calling into or out of an enclave). In some embodiments, the entire virtual memory space of an enclave client may be shared with (and accessible from) the enclave, such that a request to allocate shared memory may be implemented as a request to allocate memory for the enclave's client. In some embodiments, methods of allocating shared memory are available to both an enclave and its client.

A request from an enclave client may be a request to perform an abstraction platform primitive and may include, for example, a request to: instantiate an enclave; verify an attestation report of an enclave; call a function inside an enclave (call into an enclave); and allocate memory that can be shared between an enclave and its client.

An abstraction platform request may be translated into a native platform request in operations 1204-1208. Parameters included or implied in the received request may be converted in optional step 1204 if it is determined, for example, the data format of a parameter in the original request is not the same as the data format for that parameter in the native platform. For example, if a request from an enclave or client includes a parameter derived from an abstraction format attestation report, such as an enclave abstraction identity, will be converted into a parameter used in a native format attestation report, such as a native enclave identity.

If it is determined that the calling convention of the native platform and the received request differ, the calling convention can be converted in optional step 1206. A calling convention may be converted, for example, by reordering parameters on a call stack, moving parameters between processor registers and a call stack, and converting between error condition communication methods such as returning an error value and calling an exception handler.

In some embodiments, the native platform may be identical to the abstraction platform for some requests, in which case the conversion operations of box 1204 and 1206 may be skipped.

In box 1208, the converted request is sent to the native platform to cause the request to be performed by the native platform. For example, in the case where the native platform conforms to the Intel Software Guard Extensions (SGX) enclave architecture, the native platform may include processor instructions for enclaves. In this case, sending the request in box 1208 may include executing one or more processor instructions for enclaves. In another example, the native platform may conform to the Microsoft Virtual Secure Mode (VSM) enclave architecture, which may include a hypervisor with hypercalls for enclaves. A hypercall is a software trap to hypervisor code, and a hypercall may cause a change of processor context to a context in which privileged operations may be allowed. In this VSM example, sending the request in box 1208 may include making hypercalls to the hypervisor and/or other mechanisms to switch the execution context to a context in which privileged operations may be allowed.

Sending a request to a native platform here generally means performing the request using the features of the native platform. The operation of sending the request to the native platform 1208 may involve multiple operations with the native platform, and may vary depending on the operation (or primitive) requested, such as creating an enclave, attestation, data sealing, control transfer, or use of monotonic counters and trusted time.

The CreateEnclave primitive may be used to instantiate an enclave. A CreateEnclave request to instantiate an enclave may cause an abstraction platform to create a secure container (for example by allocating some memory and establishing a security or isolation boundary for that memory), copy enclave code into that secure container (for example from an enclave image), and configure or enable entry points into the enclave code (for example according to entry point metadata in an enclave image).

Sending a CreateEnclave request to a native platform with an enclave-enabled hypervisor (a hypervisor that provides enclave management functions, such as VSM), may include allocating memory and making hypercalls to set up processor page tables for the memory in a manner that prevents code outside the enclave container from accessing that memory. Enclave creation hypercalls from the abstraction platform may also cause the hypervisor to setup configuration information for control transfer into the enclave at designated entry points. Later, code outside the secure container can make control transfer hypercalls to transfer execution at the designated entry points inside the secure container.

Sending a CreateEnclave request to a native platform with an enclave-enabled processor (a processor with enclave management processor instructions, such as SGX), may include the abstraction platform executing an instruction such as ECREATE to inform the CPU that a certain a memory area should be created as a secure enclave container, and executing an instruction such as EADD to add data pages to that enclave container. Special processor instructions may also be used to create special pages in memory for designating the entry points in the enclave for control transfer into the enclave. Later, code outside the secure container can execute an instruction such as EENTER specifying one of the designated entry points to transfer execution control to that enclave entry point.

The CreateReport primitive may be used to create an attestation report. A CreateReport request to create an attestation report of an enclave may be performed by an abstraction layer as explained above regarding FIGS. 5 and 7. With an enclave-enabled hypervisor, an abstraction layer may send the request to the native platform by making a hypercall that changes the execution state to, for example, a security monitor context that has access to a secret key such as PrivAK726 of FIG. 7 that can be used to signed reports. This secret key may only be available to the security monitor context if the computer was booted in a healthy configuration as verified with a TCG log based in a TPM. The security monitor may tag the report data with an identity of the enclave being attested.

With an enclave-enabled processor, a CreateReport request may be sent to the native platform by executing an instruction, such as EREPORT, that generates a report and sends it to a special enclave that will have access to a private key for signing reports.

The EnclaveSeal primitive may be used to seal data to an enclave. Sealing data to an enclave encrypts the data in a manner or with a key that is associated with the enclave. An EnclaveSeal request may be a request to seal data located inside an enclave, such as all or part of the enclave's state, to the enclave using a sealing policy. The sealing policy, such as SEALING_POLICY above, may specify an enclave identity type that indicates which enclaves should be able to unseal the data. The sealing processes itself may use an encryption key associated with the enclave identity specified in the sealing policy. Later, a new enclave instantiation may be able to unseal the data if the new enclave's identity value at the specified identity type is the same as the sealing enclave's identity value at the specified identity type.

Data sealing allows secret or sensitive enclave data to be copied safely to unsecured storage, such as to memory outside the enclave's secure container or to persistent storage such as a hard disk. When the sealed data is enclave state data, sealing allows an enclave to be reset to a previous state, and allows a secure enclave operation to be interrupted and later continued in another enclave.

To reset an enclave state, first an enclave's state is saved by sealing its state to the enclave. Sealing may be done by encrypting the state data with a key associated with the enclave. Later, perhaps after the enclave's state has changed, the sealed state data may be unsealed to the same enclave by decrypting the sealed data and then replacing a current state of the enclave with the decrypted data (for example by copying the decrypted data into enclave's secure container).

To interrupt a secure operation and continue in another enclave, the secure operation starts by executing an operation comprising multiple processor instructions in a first enclave. When the first enclave is interrupted, state of that enclave may be sealed to an enclave identity specified in the sealing policy, and the sealed data can then be saved in unsecured storage, such as local or cloud-based persistent storage. The first enclave may then be (optionally) terminated or start other enclave operations. A second enclave may be instantiated or repurposed to continue the interrupted operation by unsealing the sealed state data into the second enclave. The interrupted operation can be continued in the second enclave where the first enclave left off.

With an enclave-enabled hypervisor, an abstraction layer may send an EnclaveSeal request to the native platform by making a hypercall. The hypercall may change execution state to a context, for example a security monitor context, that will have access to a secret sealing key associated with the enclave that can be used to seal or unseal data. The sealing key may be derived from a combination of an enclave identity and a secret platform key available only to the security monitor. This platform key may only be available to the security monitor when the machine is booted in a healthy configuration, and the boot configuration is verified with a TCG log based on a TPM. In this enclave-enabled hypervisor embodiment, the enclave code never has access to the sealing key.

With an enclave-enabled processor, a EnclaveSeal request may be sent to the native platform by executing an instruction, such as EGETKEY, to get an encryption key. This algorithm may generate a sealing key that is unique to the enclave. The sealing key may be derived from an identity of the enclave and a secret embedded in the processor. Code inside an enclave may then encrypt the data with the sealing key. Data may be sealed by encrypting with the sealing key, for example by code inside an enclave, by an abstraction platform, or by a native platform. EnclaveUnseal may similarly use EGETKEY to generate the unsealing key.

A control transfer request may be a request to transfer processor execution control from instructions inside an enclave out to an entry point outside the enclave (for example CallEnclaveOut), or the reverse from instructions outside the enclave to an entry point inside the enclave (for example CallEnclaveIn). This may be done, for example, for a secure database operation. After instantiating a database enclave, an enclave client may request that the enclave perform a specific operation, such as a database query by using CallEnclaveIn primitive to transfer control to an entry point inside the database enclave that will perform the query. After the enclave completes the query, the result of the query may be returned (possibly after encrypting the result) to the client with the CallEnclaveOut primitive to transfer control back to the client at an entry point in the client that may receive the query result. The CallEnclaveIn and CallEnclaveOut primitives may take a pointer to a memory buffer that may be shared between an enclave and its client (the buffer may be readable, writable, and/or executable by either the enclave or its client).

With an enclave-enabled hypervisor, an abstraction layer may send an CallEnclaveIn request to the native platform by making a hypercall. The hypercall may change execution state to a context, for example a security monitor context, that will save the CPU registers, restore a previously saved set of enclave CPU register values (possibly from enclave memory), change the page table configuration to allow access to the enclave's protected memory, and invoke a function entry point inside the enclave. Similarly, when an abstraction platform receives a CallEnclaveOut request, the request may be sent on to the native platform by a hypercall that will save the enclave CPU registers (possibly saving to enclave memory) and restore the previously saved CPU registers for an enclave client, change the page table configuration to prevent access to enclave memory, and transfer processor control to an entry point in the enclave client outside of the enclave.

With an enclave-enabled processor, a CallEnclaveIn request may be sent to the native platform by executing an instruction, such as EENTER, that may cause the CPU to restore a set of enclave CPU registers (possibly from enclave memory) and invoke a function (transfer control to an entry point) inside the enclave. A CallEnclaveOut primitive may execute an instruction, such as EEXIT, that may transfer control to instructions outside the enclave and/or cause a fault that transfers control outside the enclave.

Monotonic counter have a variety of uses. For example, an enclave may want to restrict the how far back its state may be reverted. Monotonic counters may be use, for example, as a nonce to guarantee freshness of messages, as discussed above with respect to FIG. 4. Monotonic counters generally have the ability to be read, and to be incremented, but cannot be decremented. To restrict rollback or reverting an enclave's state, the code inside an enclave may increment a monotonic counter associated, and then save the counter's value along with the enclave's internal state. The state and counter value may be saved, for example, with the EnclaveSeal primitive. Later, when restoring the enclave state, for example using the EnclaveUnseal primitive, the code inside the enclave may read the current value of the monotonic counter and compares it to the counter value with the unsealed state. If the value of the counter with the unsealed state is smaller than the current value of the counter, the enclave may prevent use of the unsealed state.

With an enclave-enabled hypervisor, an abstraction layer may send a request to the native platform to read or increment a monotonic counter by making a hypercall that is exposed to the enclave. When a hypercall to read or increment the counter is invoked, the processor will change the execution state to a context, such as a security monitor, that will verify the identity of the enclave making hypercall, and then read from or increment, respectively, the corresponding monotonic counter stored in, for example a non-volatile storage such as a TPM chip. Alternatively the security monitor may read or increment a counter stored on a remote trusted server or a set of remote trusted servers, by establishing a secure communication channel with such server and asking it to read or increment a specified monotonic counter. The remote trusted server or servers may maintain the counter inside an enclave to isolate it from the rest of the code in the host computer.

With an enclave-enabled processor, a request may be sent to the native platform by executing an instruction. With such a processor, the monotonic counter primitives may be implemented by reading or incrementing a counter in non-volatile memory storage in a chip in the computer motherboard. Alternatively these primitives may also be implemented using a trusted remove server as with the enclave-enabled hypervisor.

Figure 13:
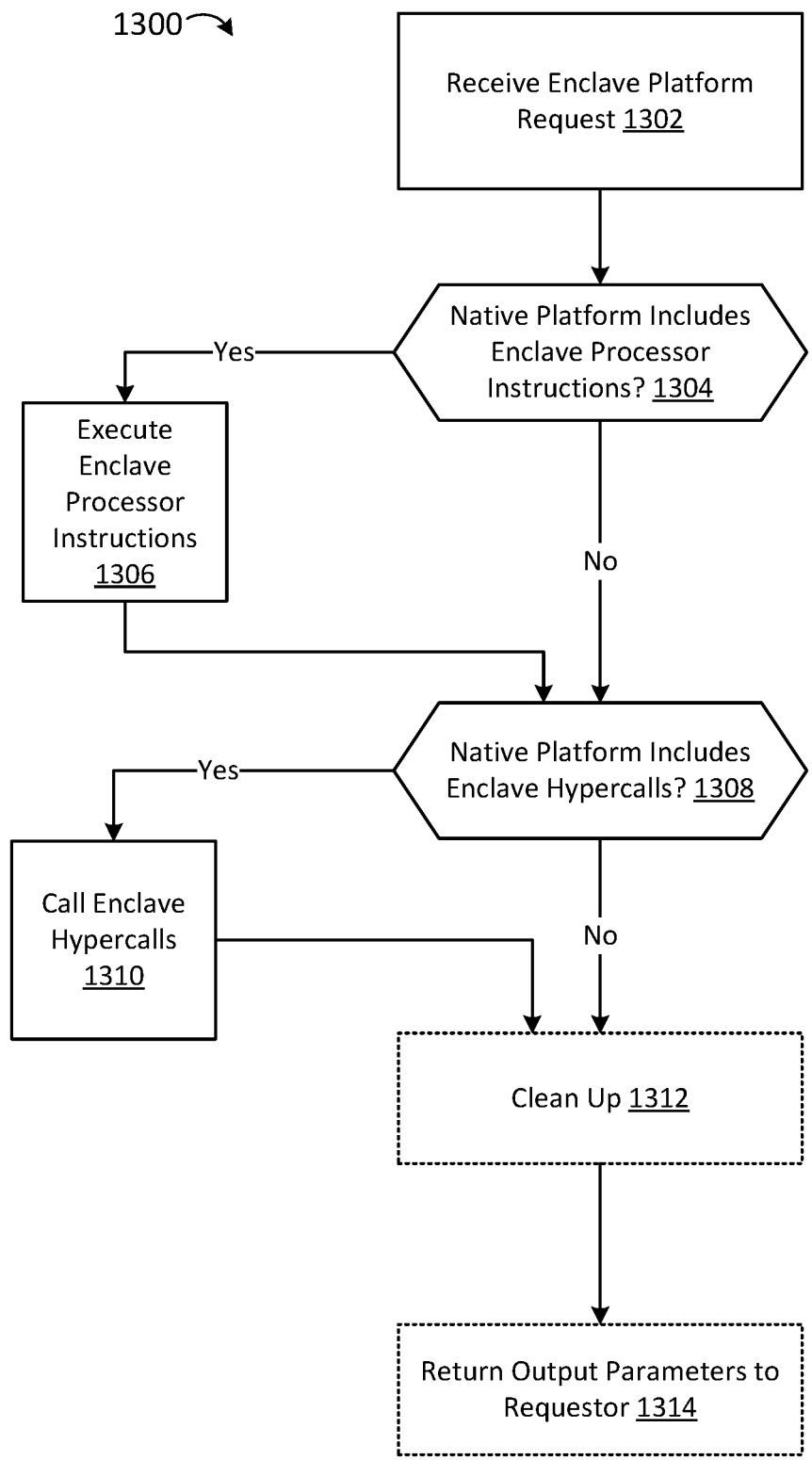
FIG. 13 depicts an example flowchart for a method of abstracting a native enclave platform.

FIG. 13 depicts an example flowchart for a method 1300 of abstracting a native enclave platform. An enclave abstraction platform may receive a request from an enclave or enclave client in box 1302. In box 1304, the abstraction platform may determine if a native platform includes enclave processor instructions, for example, by determining if the native platform conforms to SGX. If it does, enclave processor instructions are executed in box 1306. In box 1308, the abstraction platform may determine if a native platform includes enclave hypercalls, for example by determining if the native platform conforms to VSM. If it does, the native platform makes enclave hypercalls. The results from executing the enclave instructions or calling the enclave hypercalls are cleaned up in box 1312. Clean up may include, for example, converting the output parameters or the exception handling of the enclave processor instructions or the enclave hypercalls into the format or protocol of the abstraction layer interface. The converted output parameters are then returned to the original requestor (enclave or client) in box 1314.

Abstract Enclave Identity

Figure 14:
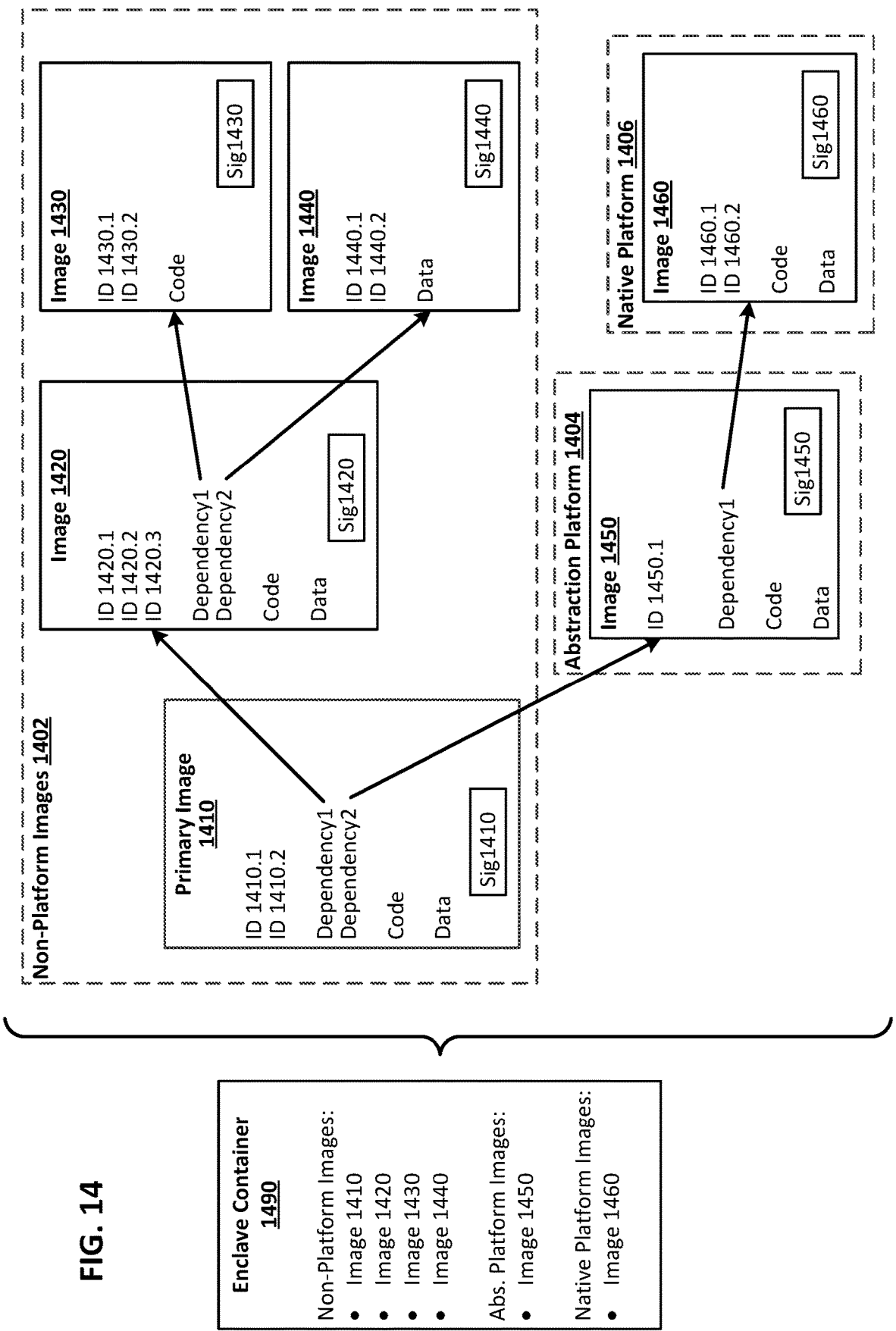
FIG. 14 depicts an example flowchart for a method of performing an enclave operation with abstract enclave identity.

FIG. 14 depicts example enclave binary images used to instantiate an enclave. An enclave may be instantiated by creating a secure container, such as enclave container 1490, and copying portions of one or more enclave images into the container. Enclave container 1490 may have been created by reference to primary enclave image 1410. A primary image may include references to other dependent enclave images. In this example, primary image 1410 includes Dependency1 and Dependency2 as references to dependent enclave images 1420 and 1450, respectively. Image 1420 includes further dependencies on images 1430 and 1440, while image 1450 depends on image 1460. Once all these images (or portions thereof) are copied into container 1490, the resultant enclave may include non-platform images 1402, which may include code and data that is unique or specific to the instantiated enclave, abstraction platform 1404 images, and native platform images 1406.

Each enclave image, such as primary image 1410, may include IDs, dependencies, code, data, and a signature of the image's author. In the example of image 1410, two IDs 1410.1 and 1410.2 are included. These IDs may be UUIDs that specify, for example, an abstract identity value corresponding to an ImageID, FamilyID, or AuthorID value that, individually or collectively, may be used to identify an any enclave instantiated with that enclave image. As depicted, image 1410 has two IDs, but fewer or more IDs are feasible. Code in the image 1410 may be binary instructions executable by the processor of the computer hosting enclave container 1490. Data in image 1410 may be used by any code loaded into the container 1410. Image 1410 may also include a signature Sig 1410 to ensure the integrity of any or all of the other contents of the image, such as IDs, dependency references, code and data. Other images 1420-1460 may similarly contain IDs, dependency references, code, data, and signatures.

A dependency indicator, such as Dependence1 and Dependence 2 or image 1410, Dependence1 and dependence 2 of image 1420, and Dependency 1 of image 1450, may be specified in a variety of ways. If the images 1410-1460 are stored in a computer system's memory, a dependency indicator may simply be an address in memory. If the enclave images are files in a file system, the references may be file names. In some embodiments, the references may be a logical identifier. A logical identifier might be a unique number, such as a UUID, or might be other data, such as a text string, that otherwise identifies a dependency image. For example, a text string may indicate a dependent binary image's author, source, product name, product family, and/or version number. A logical identifier includes a web or internet location, such as a location where a copy of a dependent binary might retrieved.

In some embodiments, an enclave image file may be located by looking up a dependency indicator, such as a logical identifier, in a registry of enclave images to find a pointer to the current version or local copy of the referenced enclave image. In some cases, a trusted service may be used to resolve a dependency indicator into identification of a particular enclave image or image location.

In some embodiments, a dependency indicator may be a cryptographically secure identifier, such as a cryptographic hash of the intended dependent enclave binary image. Such a hash may include all of the dependent binary, or only a portion thereof. The portion of a dependent binary included in a dependency indicator has may include abstract identity values, such as ID 1410.1 or ID 1420.2, and may be abstract identity values. A resolution service for a cryptographically secure identifier may not need to be as trusted as with a logical identifier because the entity determining enclave dependencies may be able to verify that the correct dependent image was found by computing the hash of the dependent binary itself.

Figure 15:
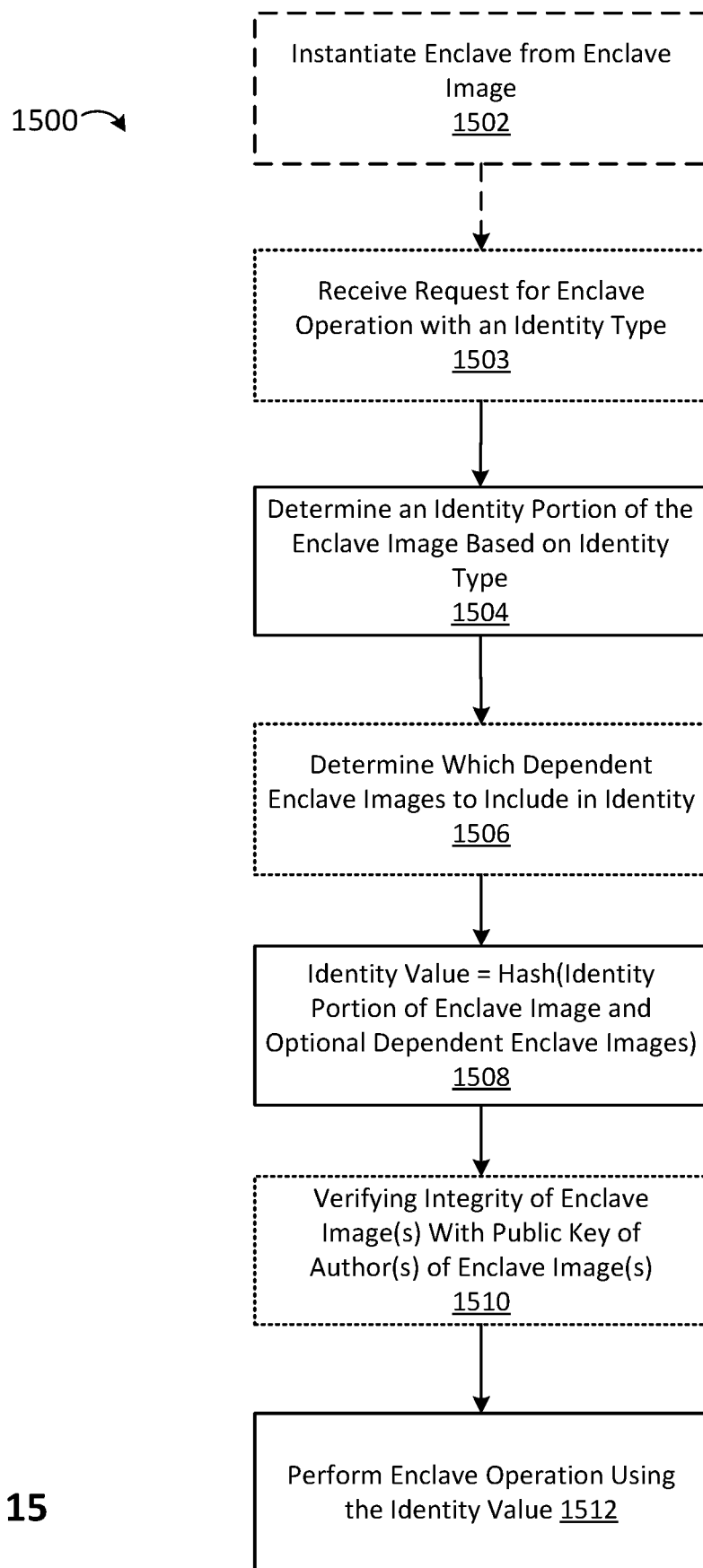
FIG. 15 depicts an example flowchart for a method 1500 of performing an enclave operation with abstract enclave identity.

FIG. 15 depicts an example flowchart for a method 1500 of performing an enclave operation with abstract enclave identity. An abstract identity value for an enclave may provide a basis for determining equivalence between two enclaves that have some feature in common but are not exactly identical. An identity value may be included in an attestation report and may be associated with abstract identity type (such ExactHash, InstanceHash, ImageID, FamilyID, or AuthorID). Two enclaves that are not exactly the same may have the same abstract identity value for an abstract identity type. Additionally, identical enclave code instantiated into secure containers on two different native enclave platforms may also have the same abstract identity value. Method 1500 may be performed, for example, by an abstraction platform layer between a native enclave platform and either an enclave or an enclave client.

In box 1502, an enclave is instantiated from an enclave image, such as the primary enclave image 1410 of FIG. 14. The enclave image may be a primary image including enclave code, data, a list of identities, a list of any dependent enclave images, and a signature. To ensure the integrity of the enclave images, the images may be signed with a private key that may correspond to the author of the enclave image. The list of enclave identity IDs in the enclave image may correspond to abstract identity types such as an ImageID, a FamilyID, and an AuthorID, each intended to identify the enclave image collectively along with other related enclave images. A list of dependent enclave images may refer to other enclave images containing enclave code that the code in the primary enclave image depends upon. A dependent enclave image may or may not be authored by the same author, and some dependent enclave images may be associated with an enclave platform generally (either an abstraction platform or native platform) rather than particularly associated with a primary enclave image or the primary enclave image's author. The enclave may be instantiated by creating a secure enclave container using any native enclave platform, and copying all or a portion of the primary image and any dependent enclave images into the secure container.

In box 1503, an enclave operation is requested, for example by an enclave or an enclave client, along with an enclave identity type. The identity type may specify a type of abstract identity, such as Image ID or AuthorID, and be related to a particular instantiated enclave, but does not specify the AuthorID value for that enclave. The remainder of method 1500 following box 1503 describes operations for performing the operation (such as attestation, data sealing, or use of a monotonic counter, etc.) with the instantiated enclave using an identity value derived for that identity type of the instantiated enclave. The identity may be determined using a hash of a subset of the enclave image(s). Which subset of the enclave image(s) are used as input to the hash may be based in part on the identity type desired to be used in the enclave operation.

In box 1504, a portion of the enclave image, called an identity portion herein, is determined based on the identity type. The identity portion may include all of, part of, or none of the various enclave binary images used to instantiate an enclave in box 1502. The identity portion may include all of, a portion of, or none of the enclave code contained in the enclave image. The identity portion may also include zero, one, or more identity IDs listed in a non-code portion of the included enclave images. The identity portion may or may not also include enclave data contained the enclave images. The identity portion may include any combination of these various parts of the enclave images. For example, an identity portion may include all code, none of the data, and two or four available identity IDs. In optional box 1506, which dependent enclave images are to be included in the identity portion is determined, and an identity portion of each included image is determined.

The identity portion of dependent images may or may not be the same as the identity portion of a primary enclave image. For example, all code and the ImageID are included in the identity portion of a primary image, while no code and only the FamilyID of a dependent image may be included in the identity portion of the dependent image.

When enclave code is included in the identity portion, the portions of enclave code in the identity portion may be determined by a combination of the identity type and an indication of which dependencies are to be included in the identity portion. Identity type InstanceHash may include, for example, enclave code in the primary image, but no dependent images, while identity type ExactHash may include the enclave code in all dependent images that are not considered part of an enclave platform. For example, all dependent enclave images that are not signed with an enclave platform author's private key may be considered to not be part of the enclave platform. Alternately or in addition, the primary image may include a list of which dependent enclave images are to be included or excluded in the identity portion for InstanceHash or ExactHash identity types.

Enclave identity IDs, which may be included as metadata in an enclave image, may be included in the identity portion of the enclave image instead of, or in addition to, enclave code. For example, the identity portion for identity types ImageID, FamilyID, and AuthorID may include a corresponding ID metadata from the enclave image. When identity types are nested or layered, the identity portion for lower level types may include the ID data for higher level types. For example, the identity portion for ImageID may include the ID data for ImageID, FamilyID, and Author ID, while the identity portion for AuthorID may only include the ID data for AuthorID.

Identity types that include enclave code, such as InstanceHash and ExactHash, provide a higher level of assurance, for example to the enclave client via attestation, that certain enclave code is running inside an enclave. However, the identity of the enclave will necessarily change when any of the identity portion of the enclave code changes. For example, if a security fix or other bug is fixed in a new version of an enclave image, the resulting identity value based on the new code will also change. By providing a mechanism for certain portions of enclave code to be excluded from the identity hash calculation, the identity of an enclave can be decoupled from changes to the excluded portion of enclave code. For example, when one author's enclave code depends on enclave code provided by the enclave platform, the enclave identity may be decoupled from revisions to the dependent platform.

In box 1508, an identity value is determined that may represent an identity of the enclave instantiated in box 1502. An identity value may be determined by calculating a hash over the previously determined identity portion of the enclave image or images (the identity value is the output of a hash function where the identity portion is the input to the hash function). In some embodiments, the input to the hash function will be portions of the original enclave image(s), while in other embodiments, the input to the hash function will be portions of an enclave container after having copied the identity portion of the image into the container (and possibly decrypted the identity portion in the case where an original enclave image is encrypted).

In box 1510, the integrity of the resulting identity value can be optionally verified by verifying the integrity of the original enclave image(s). The integrity of an enclave image can be verified with a public key corresponding to a private key used to sign the enclave image. Such a public/private key pair may be associated, for example, with the author of the enclave image(s), so that trust in the resulting identity value may be rooted in trust of the enclave's author.

Finally, in box 1512, an operation related to the instantiated enclave may be performed using the identity value. For example: an attestation report of the instantiated enclave may be generated or verified for an identity type; data may be sealed to or unsealed from the instantiated enclave at an identity; and a monotonic counter or a trusted time tied to the instantiated enclave and identity type can be used.

Enclave operations using higher-level identity types enable interactions between groups of possible enclave instantiations. Attestation to a high-level identity type may provide attestation report equivalence for all enclaves with the same high-level identity. For example, an attestation report to an AuthorID identity type may be equivalent to the attestation report from all enclaves instantiated from a primary image containing the same AuthorID metadata. Data sealed to a high-level identity type may be unsealed by any enclave with the same high-level identity value. For example, data sealed to an instantiated enclave with the AuthorID identity type can be unsealed by any other instantiated enclave with the same AuthorID metadata in its enclave primary image.

Enclave Identity Equivalence

Figure 16:
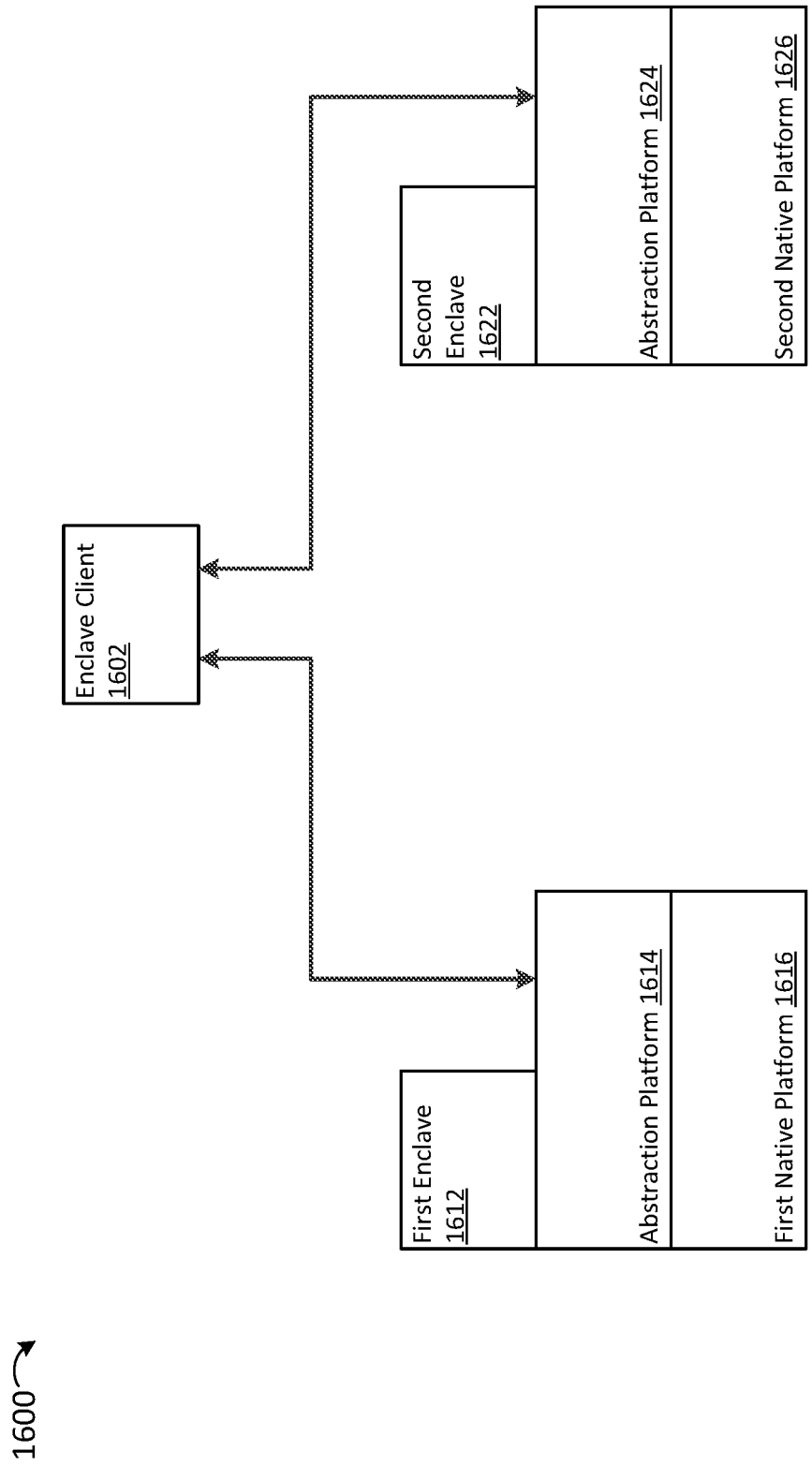
FIG. 16 depicts an example system with abstract enclave identity equivalence.

FIG. 16 depicts an example system with abstract enclave identity equivalence. An enclave client 1602 may communicate with a first enclave 1612 instantiated in a secure enclave container of first native platform 1616 via abstraction platform 1614, and client 1602 may also communicate with a second enclave 1622 instantiated in a secure enclave container of second native platform 1626 via abstraction platform 1624. First native platform 1616 may or may not reside on the same computer as the second native platform. Enclave client 1602 may reside on the same computer as either of the native platforms, or may reside on a separate third computer. The first native platform 1616 may not be the same as the second native platform 1626. For example the first native platform 1616 may be an older version of the second native platform from the same native platform manufacturer. Alternately, first native platform 1616 and second native platform 1626 may conform to completely different enclave architectures, such as VSM and SGX.

An enclave client may securely determine that enclaves are equivalent by comparing identity values derived from attestation reports. Enclave client 1602 may securely identify each of the enclaves by receiving separate attestation reports from the first enclave 1612 and the second enclave 1622. An identity value may be included (or derived from) each of these attestation reports. If the identity values are the same, enclave client 1602 may have confidence that first enclave 1612 and second enclave 1622 are equivalent in some sense. The identity values from the attestation reports may be abstract identity values corresponding to a particular abstract identity type (such ExactHash, InstanceHash, ImageID, FamilyID, or AuthorID), or hashes of such abstract identity values. In this case, equivalence may be determined where the enclaves are not exactly identical. Two enclaves may not be exactly identical but still determined to be equivalent for example where enclave images loaded into the enclave container are different versions of the same functionality, or same primary images with different dependent images, or the same enclave images loaded into enclave containers of different enclave architectures.

First enclave 1612 may be considered equivalent but not identical to second enclave 1622 for a variety of situations. In a first example, only a subset of code initially loaded into the enclave containers is the same (for example, equivalent for abstract identity types ExactHash or InstanceHash). In a second example, the author of the enclave code may have included an identical ID in two different enclave binary images, even though the code in the two binary images is different (for example, equivalent for identity types ImageID, FamilyID, or AuthorID). In a third example, the code in each enclave is entirely the same but is loaded (instantiated) onto different native platforms. In this third example, the first native platform 1616 and second native platform 1626 may be manufactured by different manufacturers and hence the trust of the different attestation reports is rooted in the different certificate authorities (see FIG. 7, element 738) of the different manufacturers. An example where the two native platforms are different is in a server farm or in cloud computing where the servers allocated for the processing workloads of the first and second enclaves are servers that do not support the same native enclave platform.

In an alternate embodiment, the first enclave may be the client of the second enclave, such that boxes 1602 and 1612 are combined. Determining enclave equivalence in this embodiment may include determining, within the first enclave, that an identity value from an attestation report of the second enclave is the same as the first enclave's own identity value (at a particular abstract identity level).

Figure 17:
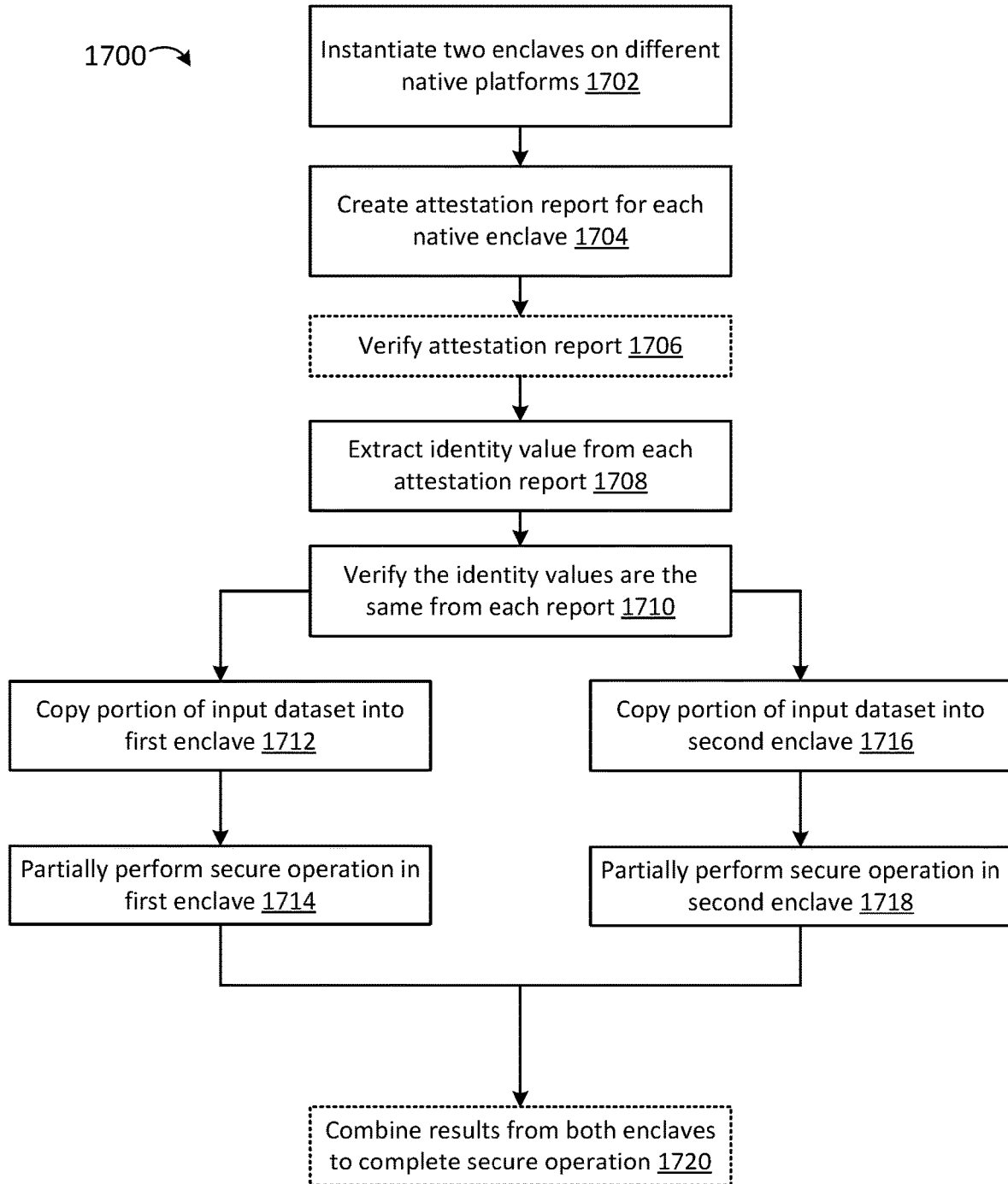
FIG. 17 depicts an example flowchart for parallel processing with two equivalent enclaves.

FIG. 17 depicts an example flowchart for parallel processing with two equivalent enclaves. Process 1700 may be performed, for example, by a client of two or more different enclaves. In box 1702, two enclaves are instantiated on different native platform instances, for example as depicted in FIG. 16. The enclaves may be instantiated by an enclave client specifying an enclave binary image (such as primary image 1410 of FIG. 14) via a CreateEnclave method of abstraction platforms 1614 and 1624. The enclave binary image specified to instantiate the two enclaves may be the same or different. An attestation report for each instantiated enclave is created in box 1704. The attestation reports may be created, for example, at the request of enclave client or at the request of the enclaves themselves. An entity wishing to prove equivalence of the two enclaves, such as the enclave client, obtains copies of both attestation reports. The attestation reports may be optionally verified in box 1706. For example, the integrity of the report may be verified by verifying the attestation signature with an endorsement certificate (such as FIG. 7, element 728) of the native platform that produced the attestation report. Further, the endorsement certificate can be verified with the native platform manufacturer's public key (such as FIG. 7, element 732). Identity values (or a hash thereof) may be extracted from each attestation report in box 1708, and equivalence of the two enclaves can be determined by verifying that the extracted identity values are the same for each enclave. These identity values may be abstract identity values (or hashes thereof) associated with an identity type.

Once an enclave client has proven the equivalence of two enclave instantiations from operations in boxes 1708 and 1710, the two enclaves may be used interchangeably, according to the type of equivalence shown. Boxes 1712-1720 depict an example method of using the equivalent enclaves for using the two instantiated, equivalent enclaves in a parallel processing manner. In boxes 1712 and 1716, a portion of an input dataset, such as portion of a database or portion of a digital image file, is copied into the first and second enclave. The portion of the dataset copied may be identical or different according to the processing task at hand. A processing operation may be securely performed in parallel by simultaneously partially performing the operation in the first enclave in box 1714 and partially performing the operation in the second enclave in box 1718. The operation may be, for example, to search the database or perform an image processing operation. The first enclave may search the first half of the database or perform the image processing operation on the first half of an image, while the second enclave may search the second half of the database or perform the image processing operation of the second half of the image. Finally, in box 1720, the results of the parallel processing in the first and second enclave may be combined, for example by combining the two sorted halves of the database, or putting the two image halves back together.

Figure 18:
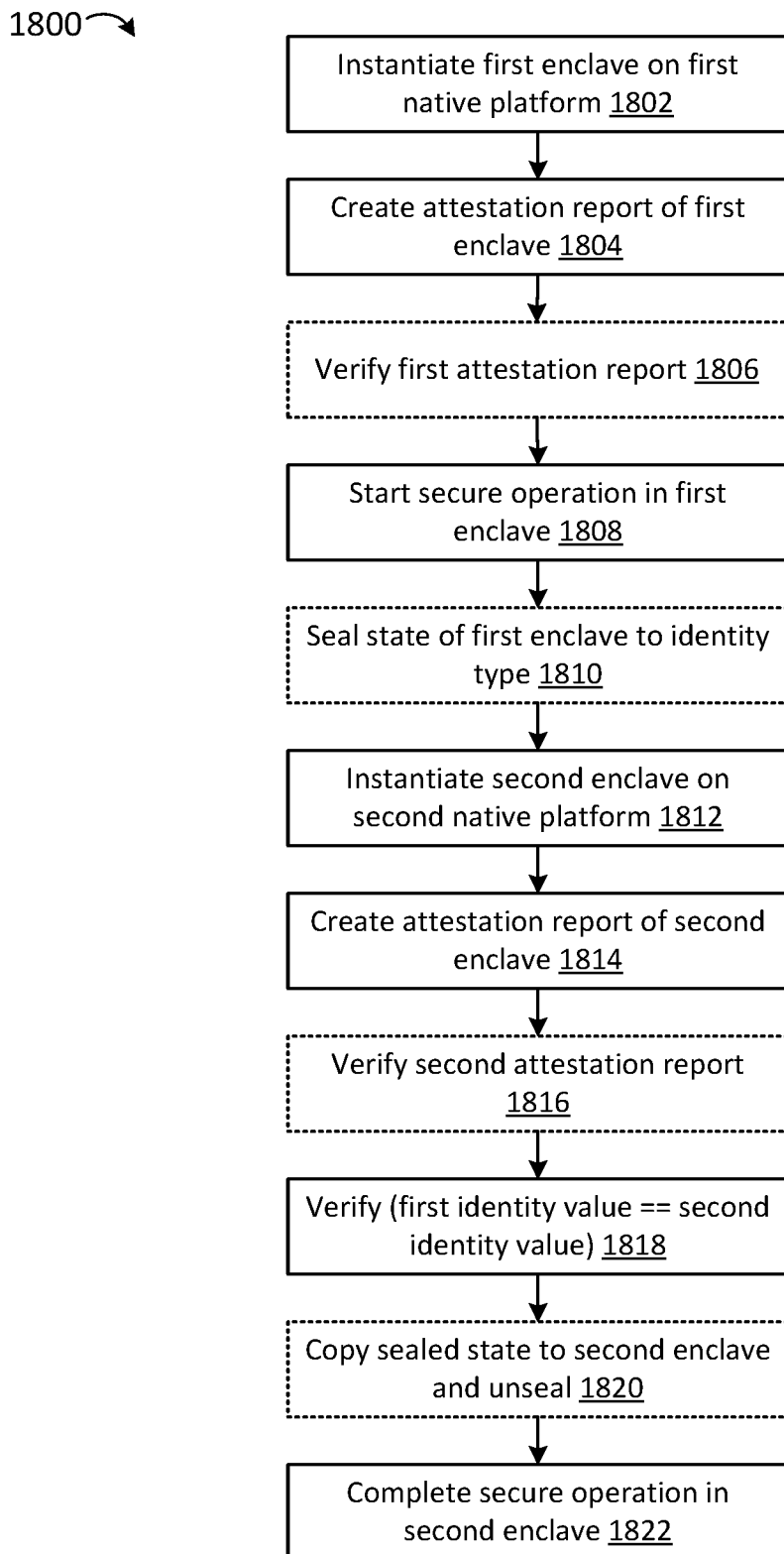
FIG. 18 depicts an example flowchart for serial processing with two equivalent enclaves.

FIG. 18 depicts an example flowchart for serial processing with two equivalent enclaves. As depicted in FIG. 18, an enclave operation, such as a database operation or an image processing operation, is done securely in two sequential parts in two separate enclaves. Process 1800 may be performed, for example, by enclave client 1602 of FIG. 16. In box 1802, a first enclave is created on a first native enclave platform, and an attestation report of the first enclave is created in box 1804. This first attestation report (of the first enclave) may be verified in box 1806, for example as described above regarding box 1706 of FIG. 17. In box 1808, a secure operation is started in the first enclave, but not completed. The state of the first enclave may optionally be sealed to be safely moved out of the first enclave in box

1810. For example the first enclave state may be sealed to an identity type of the first enclave. Once the enclave state has been saved, the first enclave may be terminated (not pictured).

A second enclave is used starting in box 1812. In box 1812, the second enclave is instantiated on a second native platform. As in FIGS. 16 and 17, the second native platform may or may not be hosted on the same computer as the first native platform, and the first and second native platforms may be the same or different. An attestation report of the second native platform is created in box 1814, and, optionally, this second attestation report may be verified in box 1816. An identity value from the first and second attestation reports may be compared in box 1818 to verify the equivalence of the first and second enclaves. In alternate embodiments, the second enclave may be instantiated and equivalence verified (boxes 1812-1818) before the secure operation is started in the first enclave in box 1808. To continue the secure operation started in the first enclave, the sealed state from the first enclave maybe copied into the second enclave and unsealed in box 1820. In box 1822, the secure operation is completed in the second enclave (using the enclave state securely copied from the first enclave, if the state was copied).

Distributed Data Sealing

Figure 19:
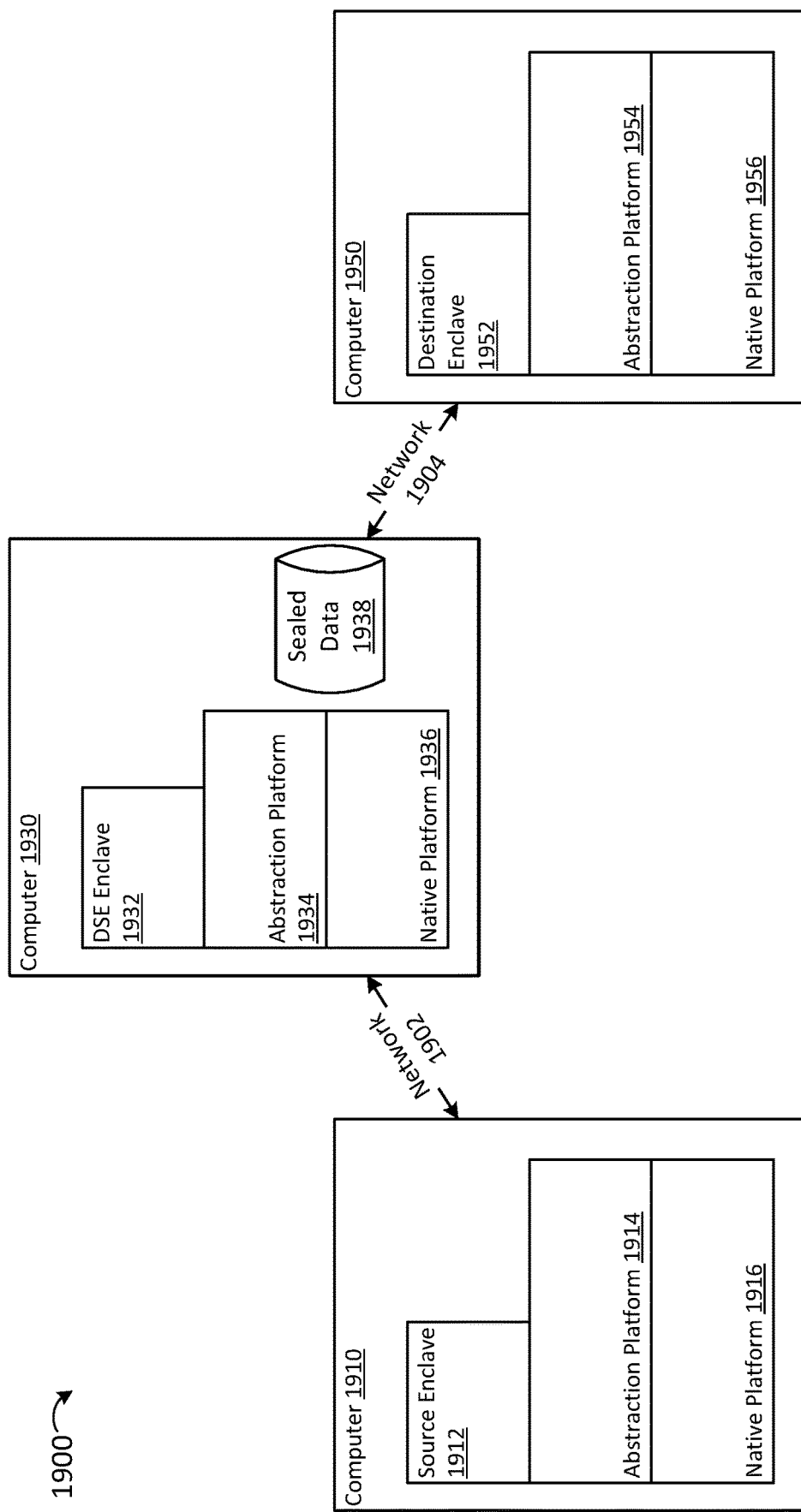
FIG. 19 is a block diagram of an example distributed data sealing system.

FIG. 19 is a block diagram of an example distributed data sealing system. Data sealing may be distributed across multiple enclaves, where those enclaves are hosted on separate native enclave platforms, and/or on separate computers. As explained above, the EnclaveSeal and EnclaveUnseal abstraction primitives may seal and unseal data for an enclave using a key tied to the native enclave platform or physical computer on which an enclave is running. This may restrict unsealing to only enclaves hosted on the same computer or same native enclave platform instance. FIG. 19 depicts a distributed data sealing system, where sealing or unsealing data may occur on a different native platform or computer than the native platform and computer hosting an enclave. System 1900 includes computers 1910, 1930, 1950, with network 1902 connecting computers 1910 and 1930, and network 1904 connecting computers 1930 and 1950. Computer 1910 hosts source enclave 1912, from which data to be sealed may be sourced; computer 1930 hosts a distributed sealing enclave (DSE) 1932 for servicing distributed seal and unseal requests; and computer 1950 hosts destination enclave 1952 where data previously sealed is unsealed. As explained above regarding FIG. 9, enclaves 1912, 1932, 1952 may communicate with abstraction platforms 1914, 1934, 1954, respectively, via an enclave abstraction protocol, and abstraction platforms 1914, 1934, 1954 may communicate with native platforms 1916, 1936, and 1956, respectively, via a native protocol. In alternate embodiments, one or more enclaves 1912, 1932, 1950 may be hosted directly on native platforms 1961, 1936, 1956 without an intermediary abstraction platform. Sealed data 1938 may be data sealed to the DSE 1932 using a key associated with the DSE 1932 or its hosting native platform 1936. Sealed data 1938 may be stored in a less protected location, such as on computer 1930 outside the secure enclave container of DSE 1932, for example elsewhere in the memory space of computer 1930 or in a file system of a hard disk.

Distributed data sealing may include authentication of DSE 1930 to source enclave, for example by attestation of DSE 1932 over network 1902. Once source enclave 1912 trusts DSE 1932, the source enclave 1912 may send sensitive data over a secure communication channel to DSE 1932 along with a sealing policy for sealing by the DSE 1932. DSE 1932 may then seal the data from enclave 1912 in itself and store the sealed data in unsecured storage. Later, destination enclave 1952 may request the previously sealed data. To unseal the data, DSE 1932 may authenticate the destination enclave 1952, for example by attestation over network 1904, and verify that unsealing for destination enclave 1952 is permitted according to the sealing policy provided by source enclave 1912. DSE 1932 may unseal the previously sealed data from source enclave 1912, and then send the unsealed data over a secure communication channel to destination enclave 1952. Enclave data may be communicated securely to and from DSE 1932 by encrypting the enclave data over networks 1902 and 1904. For example, enclave data sent over network 1902 may be encrypted with a key generated during attestation of DSE 1932 to source enclave 1912, and data sent over network 1904 may be encrypted with a key generated during attestation of destination enclave 1952 to DSE 1932. Other secure communication channels are possible, such as encrypting with a public key of the destination, for example a public key associated with the DSE or a public key associated with the destination enclave.

The enclave identities used in distributed sealing and unsealing may or may not be abstract enclave identities. For example, in some embodiments with an abstraction platform layer, a sealing policy, such as one specified by a source enclave and enforced by a DSE, may identify permitted unsealing enclave identities where the permitted unsealing enclave identities are, for example, a list of abstract enclave identities, or a list of abstract identity types in combination with the source enclave's abstract identity values. In other situations a non-abstract identity may be used. For example, in some embodiments, a DSE may be implemented with publicly available code, such that trust in the DSE is trust in knowledge of its code as opposed to trust in the author of its code. In this is example, the attestation of a DSE maybe a signed hash of all of the DSE's public code, and the input to the hash function may not include abstract identity values assigned by the author.

In some embodiments the native platforms 1916, 1936, 1956 are separate native platforms because they are hosted on different computers 1910, 1930, 1950, even if native platforms 1916, 1936, 1956 conform the same version of the same native enclave platform architecture. In other embodiments, native platforms 1916, 1936, 1956 may conform to different platform architectures or different versions of the same native enclave platform architecture. Use of abstract identities in the sealing policy may facilitate hosting source and destination enclaves on different native platform architectures.

In other embodiments of distributed data sealing not pictured in FIG. 19, there may not be three separate computers (such as separate computers 1910, 1930, 1950). For example, source and destination enclaves may be on one computer (and perhaps on a single native platform), while the DSE is on a separate computer. Alternately, a DSE may be hosted on the same computer as either the computer hosting the source enclave or the computer hosting the destination enclave. In these distributed data sealing embodiments, data sealing and unsealing is not entirely local to a single computer, as is described above with regard to the EnclaveSeal and EnclaveUnseal abstraction primitives.

Distributed data sealing may be implemented in an abstraction layer API, such as by abstraction platforms 1914, 1934, 1954. For example, DistributedEnclaveSeal and DistributedEnclaveUnseal primitives are similar to the local data sealing primitives EnclaveSeal and EnclaveUnseal discussed above.

```
DWORD
DistributedEnclaveSeal (
    _In_                SEALING_POLICY sealingPolicy,
    _In_reads_bytes_opt_(dwPlaintextSize)   LPCVOID   pPlaintext,
    _In_                DWORD     dwPlaintextSize,
    _In_reads_bytes_opt_(dwAuthdataSize)    LPCVOID   pAuthdata,
    _In_                DWORD     dwAuthdataSize,
    _Out_writes_bytes_to_(dwSealedtextSize) LPVOID pSealedtext,
    _Inout_             DWORD     dwSealedtextSize,
                        Set<EnclaveIdentity> SetOfTargetEnclaves
)
```

DistributedEnclaveSeal extends EnclaveSeal by taking an additional SetOfTargetEnclaves parameter, which allows a calling enclave, such as enclave 1910, to specify a set of enclave identities that are authorized to unseal the data provided via the pPlaintext parameter. If no identities are provided via the SetOfTargetEnclaves, a default authorized enclave identity may be assumed to be an identity of the sealing enclave, for example ExactHash or InstanceHash of the sealing enclave.

Implementation of DistributedEnclaveSeal, for example as a method of abstraction platform 1914 on the computer of the source enclave, may include establishing a secure communication channel with a DSE, such as by encrypting message over network 1902. The key(s) for this encryption may, for example, be generated during an attestation process, as described above, or may be any public key associated with the DSE 1932.

DistributedEnclaveSeal may be further generalized by taking an additional parameter KeyForData (not shown in the DistributedEnclaveSeal function prototype above). In some embodiments, multiple sets of data may be kept sealed simultaneously for a single enclave or a single enclave identity. In this case, KeyForData allows specification of which set of data is being sealed. KeyForData may be any sort of data identifier, such as a string, a number, or a set of properties. In some embodiments, KeyForData may be an input parameter to DistributedEnclaveSeal and generated by the sealing enclave, effectively enabling the sealing enclave to name the data set. In other embodiments, KeyForData may be an output parameter, where the DSE generates the KeyForData identifier as the data is sealed.

destination enclave with a public key of the destination enclave. The DSE may verify an identity of the requesting (destination) enclave such as by attestation, unseal the requested sealed data, and securely send the unsealed data to the requesting enclave. In embodiments where the requesting enclave has multiple identities, a particular identity may be specified in the Identity parameter. In embodiments where multiple enclave data sets are stored for a single enclave identity, the KeyForData parameter may specify which sealed data set (for the specified identity) is requested by using the same KeyForData value used in DistributedEnclaveSeal when the data set was sealed.

In some embodiments, the identities of enclaves authorized to unseal data may be specified (such as in the SetOfTargetEnclaves parameter) by public keys of the target authorized target enclaves. In this embodiment, attestation of the destination enclave to the DSE may not be necessary, but the unsealed data may then only be provided as encrypted using one of the specified public keys. Assuming that only the targeted enclaves have access to the corresponding private keys to decrypt, only the targeted enclaves will have access to the unsealed data.

In embodiments not pictured in FIG. 19, the functions of the distributed sealing enclave (DSE) 1932 may itself be distributed across multiple DSEs. For example the DSE functionality may be distributed across multiple DSEs on multiple computers for redundancy and fault tolerance. In this example, any replicated DSE may be able to service a seal or unseal request. Note sealed data 1938, once it is sealed/encrypted, it can safely be stored anywhere, including being replicated across cloud storage servers.

Distributed data sealing may allow movement of enclave workloads between computers. For example, the source enclave data sealed by a DSE may be state data of the source

```
DWORD
DistributedEnclaveUnseal(
    _In_reads_bytes_opt_(dwSealedtextSize)  LPCVOID   pSealedtext,
    _In_                DWORD     wSealedtextSize,
    _In_reads_bytes_opt_(dwAuthdataSize)    LPCVOID   pAuthdata,
    _In_                DWORD     dwAuthdataSize,
    _Out_writes_bytes_to_(dwPlaintextSize)  LPCVOID   pPlaintext,
    _Inout_             DWORD     dwPlaintextSize
                        Key       KeyForData,
                        EnclaveIdentity Identity
)
```

DistributedEnclaveUnseal may be implemented in abstraction platform 1954, and operate in response to a request from a destination enclave 1952. DistributedEnclaveUnseal may establish a secure communication channel to DSE 1932, for example, but encrypting messages with a key generated during attestation of the destination enclave 1952 to the DSE 1932, or by encrypting messages sent to the enclave on a first cloud server, which can be loaded into the destination enclave on a second cloud server after unsealing. This can be done similarly to as described above with respect to FIG. 18. A secure operation may start execution in the source enclave. Later, perhaps after the execution in the source enclave is interrupted, the state of the source enclave may be sealed to a DSE, and then unsealed to a destination enclave when the destination enclave is ready to continue the secure operation that was started in the source enclave.

Figure 20:
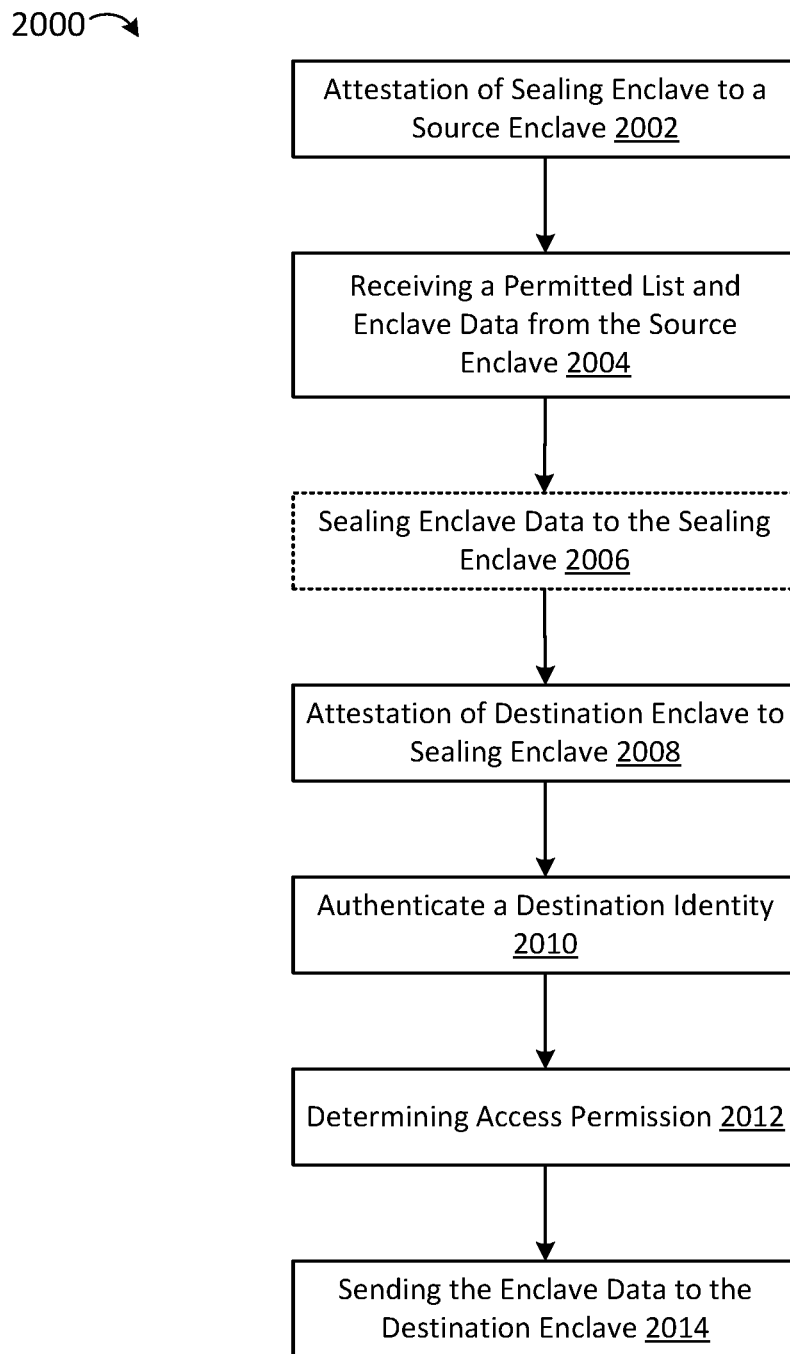
FIG. 20 is an example flowchart for distributed data sealing and unsealing.

FIG. 20 is an example flowchart for distributed data sealing and unsealing, as might be performed by a sealing enclave or DSE. Boxes 2002-2006 correspond to distributed data sealing, while boxes 2008-2010 correspond to distributed data unsealing. In response to a request to seal an enclave data set originating from a source enclave, the sealing enclave (or DSE) may attest itself to the source enclave, by sending an attestation report or quote to the source enclave in box 2002. The source enclave may verify the identity of the sealing enclave as a genuine and trusted sealing enclave, by inspecting an identity value and signature in the sealing enclave's attestation report. In box 2004, the sealing enclave receives a permitted list and the enclave data to be sealed. These may be received via a secure channel as described above regarding FIG. 19. In optional box 2006, the sealing enclave may seal the source enclave's data to itself, for example if the data is stored outside the sealing enclave's secure container, such as in a computer file system. To unseal the data for a destination enclave, the destination enclave may attest itself to the sealing enclave, such as by providing an attestation report or quote, in box 2008. In box 2010, an identity of the destination enclave may be verified, such as by inspecting the destination enclave's attestation report. In box 2012, the sealing enclave determines if the destination enclave is permitted to unseal data from the source enclave by verifying that an authenticated identity of the destination enclave is included in the permitted list received with the data. Once permission has been confirmed, the enclave data may be unsealed if it was sealed, and then sent to the destination enclave via a secure channel in box 2014.

Key Vault Enclave

Key vaults may be implemented with enclaves. A key vault securely holds keys, such as keys of an encryption system for encrypting and decrypting data, for clients of the key vault. A key vault may additionally perform operations with the key, such as encrypting and decrypting data, signing data, and deriving new keys from an existing key. A key vault, when implemented as an enclave, may provide very secure storage of and processing with secret encryption keys. Additionally, software attestation of a key vault enclave can provide high levels of assurance to a vault client that it is communicating with an authentic and trusted key vault. Highly secure systems can be built on a key vault enclave with a vault-locked key, whereby a key stored inside a key vault is never released to any client outside the key vault, and in some cases the vault-locked key may only ever exist as stored inside (or possibly sealed to) the key vault enclave.

Figure 21:
FIG. 21 is a block diagram of an example key vault enclave.

FIG. 21 is a block diagram of an example key vault enclave. Enclave 2122 is a key vault inside a secure enclave container of second native enclave platform 2126. In the example of FIG. 21, the client 2112 of key vault enclave 2122 is also an enclave, and hosted inside a secure enclave container of first native enclave platform 2116. Enclaves 2112, 2122 may interact with their respective native platforms 2116, 2126 via respective enclave abstraction platforms 2114, 2124. In other embodiments, one or both abstraction platforms 2114, 2124 may not exist where enclaves 2112 and/or 2122 interact directly with native platforms 2116, 2126.

Key vault enclave 2122 may communicate with vault client 2112 via communications channel 2150. In some embodiments, communications channel 2112 may be a secure communications channel providing assurance of confidentiality, integrity, and/or freshness of messages sent over communication channel 2150. Confidentiality and integrity of such a secure communications channel may be established, for example, with encryption and signatures, as in FIGS. 2 and 3, using shared keys generated as part of an attestation process, as in FIGS. 5 and 6.

Software attestation provides security in part by providing assurance of the identity of the entity on the other size of a communication channel. By attesting key vault enclave 2122 to a vault client, the client may gain assurance that key vault enclave 2122 is who it says it is prior to sending a secret, such as a key or other cleartext data, to the key vault. The reverse is also true for clients that are also enclaves, as depicted in FIG. 21. By attesting vault enclave 2112 to a key vault enclave 2122, the key vault may gain assurance that the client is who it says it is prior to revealing a secret, such as a key or other cleartext data, to the client.

Key vault systems with vault-locked keys and derived keys, particularly where encryption keys are derived from a vault-locked key, may be used to build a security system that is flexible and vary secure. A key derivation function, which may or may not be public, can be used to generate multiple keys from a first key. The first key (a root secret) may be vault-locked for the highest level of security, and keys derived from the first key can be used for encryption purposes. If a derived key is compromised, a new derived key can be generated in an existing system without having to access or change the key vault holding the first key.

An example key vault enclave (KVE) is a cloud-based key vault system that provides key storage, generation, derivation, distribution, encryption, decryption, and signatures using enclaves. The KVE may be identified by its exact hash (a hash of the contents of its secure container), or by an arbitrary identifier assigned by or associated with its creator. In the latter case, the enclave may be signed with the private key of its creator to avoid clashes and security breaches due to collisions of the identifier.

A key vault client may interact with a key-vault system using the following example primitives. An example StoreKey function prototype is:

StoreKey([in] Keyname, [in] KeyType, [in] KeyValue, [in] Policy)

StoreKey stores a given key in the key-vault and associates it with a given name. The key type is also associated with the key and restricts what can be done with the key. For example, some keys should only be used for encryption, other for signatures, etc. And specific keys may only be used with specific crypto algorithms. The policy may specify policies to further restrict the use of the key. For instance, it may specify a set of enclave identities which are allowed to retrieve the key and or/use the key. It may also specify temporal properties, for example, that the key should be destroyed at a certain date, or that the rate of operations using the key should be limited.

An example GenerateKey function prototype is:

GenerateKey([in] keyName, [in] keyType, [in] Policy)

Generate Key generates a new key of a certain type and keeps it stored inside the key-vault, i.e., the key never leaves the key-vault.

An example GetKey function prototype is:

GetKey([in] KeyName, [out] KeyValue)

GetKey fetches a key stored inside the key-vault. These primitives are typically implemented over a secure communication channel and the code that calls the primitive typically runs in a trusted environment. In such a context, it is often acceptable to retrieve a key from the key-vault.

An example DeleteKey function prototype is:
DeleteKey([in] keyName)
DeleteKey deletes a key from the key-vault.
An example DeriveKey function prototype is:
DeriveKey([in] newKeyName, [in] KeyName, [in] kdfIdentifier, [in] AdditionalData)
DeriveKey uses a cryptographic key derivation function (KDF) identified by kdfIdentifier to derive a new key based on the key identified by keyName and the data passed in AdditionalData.
An example Encrypt function prototype is:
Encrypt([in] KeyName, [in] algorithm, [in] data, [out] encryptedData)
Encrypt encrypts the data with the key identified by KeyName, using the requested algorithm.
An example Decrypt function prototype is:
Decrypt([in] KeyName, [in] algorithm, [in] encrytedData, [out]data)
Decrypt decrypts the data with the key identified by KeyName, using the requested algorithm.
An example Sign function prototype is:
Sign([in] KeyName, [in] algorithm, [in] data, [out] signature)
Sign signs the data with the key identified by KeyName, using the requested algorithm.
An example VerifySignature function prototype is:
VerifySignature([in]KeyName, [in] algorithm, [in] signature, [out} bool signatureIsCorrect)
VerifySignature verifies the signature with the key identified by KeyName, using the requested algorithm.

All of the above key vault primitives may be implemented by establishing a secure channel with the KVE. The channel may be established using attestation and performing a Diffie-Hellman key exchange as described above with respect to FIGS. 5 and 6. After the communication channel is established, the request is sent securely over the channel and the response is read from the channel. The channel may provide guarantees of confidentiality and integrity of the data exchanged.

In another embodiment, the first time the KVE runs, it generates a public/private key pair and it generates a quote for the public key. Then it writes out the quote and the public key, while keeping the private key inside the enclave. The public key and the quote can then be distributed to all systems/code that wish to use the key-vault. In this case, the implementation of the primitives above verify the quote to make sure it is talking with a genuine KVE, and then encrypts the requests using the public key of the KVE. As part of the request, the implementation of the primitives may include a key to encrypt and integrity protect the results sent from the KVE. This embodiment may provide a secure two-way communications channel without attestation.

Figure 22:
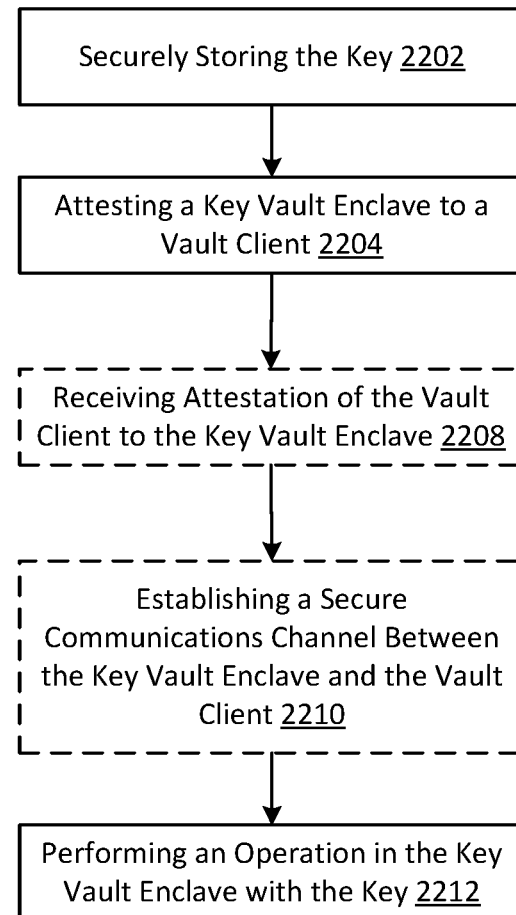
FIG. 22 is an example flowchart for some key vault enclave operations.

FIG. 22 is an example flowchart for some key vault enclave operations. Process 2200 starts inbox 2202 by securely storing, within the key vault enclave, a key used in an encryption system. The key may be used, for example, to encrypt or decrypt data, generate a cryptographic signature, or may only be used as a root key from which to derive other keys. The key may be securely stored in the key vault enclave by, for example, storing the key within the memory space of the enclave's secure container. In other embodiments, the key may be kept secure outside the secure enclave container by sealing the key data to the key vault enclave, or may be kept secure by remotely sealing with a distributed sealing enclave as described regarding FIGS. 19 and 20.

In box 2204, the key vault enclave performs an attestation process for attesting the identity of the key vault enclave to the vault client. This may give the client assurance that the key vault is not an imposter and can be trusted with secrets such as a key or data to be encrypted. Attestation of the key vault enclave may include sending, to the vault client, an attestation report or attestation quote of the key vault enclave. The key vault client can then verify the integrity of the attestation report by verifying a signature in the attestation report with a public key associated with the native enclave platform of the key vault enclave. For example, the attestation report of the key vault 2122 may be generated by second native platform 2126, and vault client 2112 may verify the signature in the report using a public key associated with second native platform 2126. This attestation process may also generate keys used for a secure communication channel between the vault client and the key vault enclave, for example as shown in FIGS. 5 and 6. The attestation report may include an identity of the key vault enclave that may be determined in various ways as described above, for example with respect to FIGS. 14 and 15. The identity may, for example, be based on a hash of the entire contents of the secure container of the key vault enclave, a hash of only a unique identifier assigned by the author/creator of the key vault enclave, or a hash of a combination of a portion of the container's contents and a unique identifier.

Some key vault enclave operations may also require assurance of the vault client's identity. For example, decrypting data or divulging a key (such as with the Decrypt or GetKey primitives) may require such assurance. In these situations, if a vault client is also an enclave, optional box 2208 includes an attestation process for verifying, by the key vault enclave, the identity of the vault client. The attestation process of box 2208 may include receiving, at the key vault enclave, an attestation report or quote of the vault client.

In optional box 2210, a secure communications channel may be established between the key vault and the key vault enclave. Secure communication may be required to pass secrets between the vault client and the key vault enclave, such as keys or data to be encrypted. The attestation process of box 2004 or 2008 may generate keys that can be used to create a secure communication channel between the vault client and the key vault enclave, for example as shown in FIGS. 5 and 6. Alternately, any known public key of a message's destination can be used to send a message securely.

In box 2212, a key operation, such as one of the key vault primitives described above, may be performed inside the key vault enclave. During this operation, the key data may be stored only in the address space of the key vault enclave's secure container. Example primitives include DeriveKey, Decrypt, Sign, and others.

Process 2200 presumes that a key vault enclave already knows the key. Note that for some key vault enclave operations or primitives, such as StoreKey or GenerateKey, the order of operations may be different from what is depicted in process 2200. For example, for GenerateKey, the key generation operation (as in box 2212) will occur before the secure storing operation of box 2202. Such an operation order is depicted in FIG. 23, boxes 2302-2308.

Figure 23:
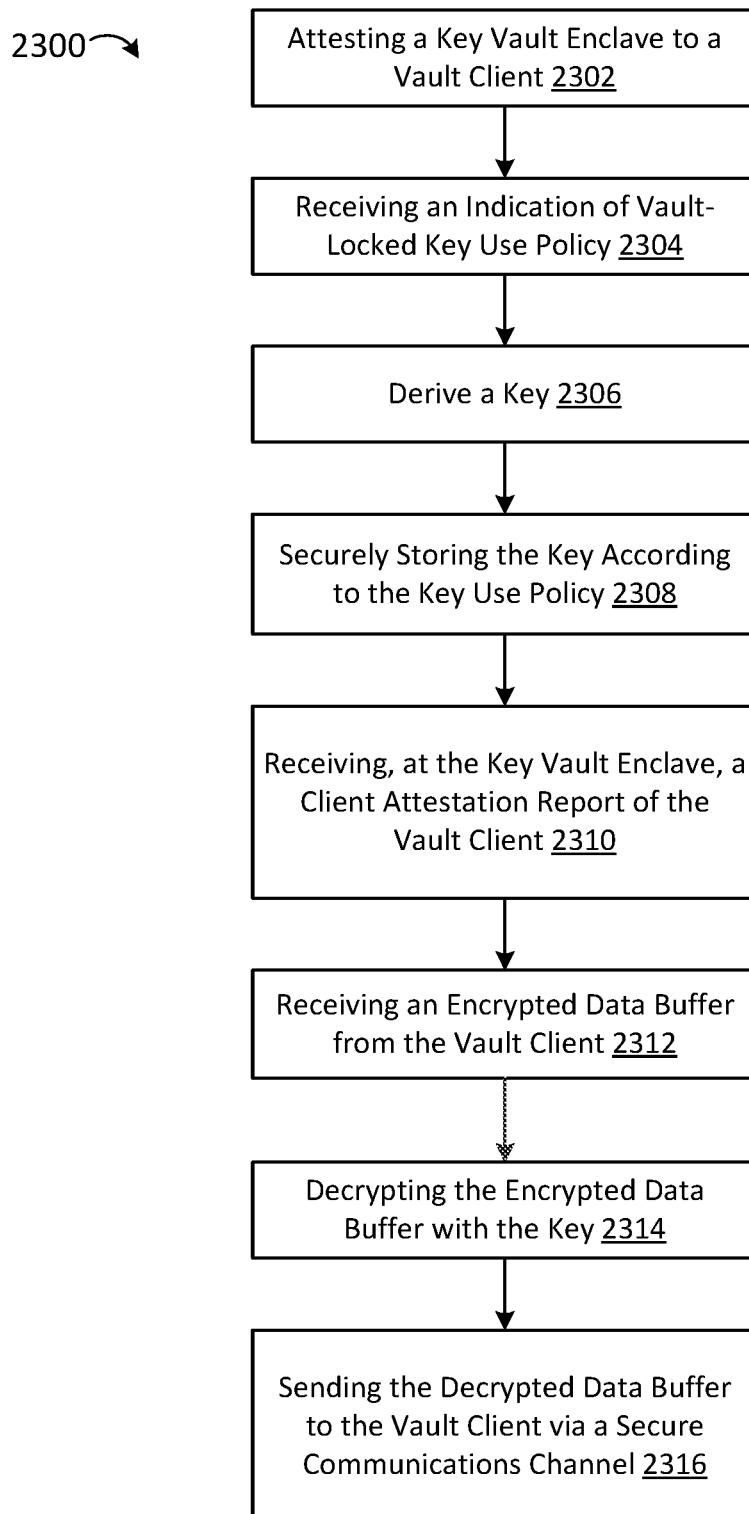
FIG. 23 is an example flowchart for key vault enclave operation with a vault-locked key.

FIG. 23 is an example flowchart for creating and using a key vault enclave with a vault-locked key. In boxes 2302-2308 of process 2300, a new key is derived within the key vault enclave. In boxes 2310-2316, the newly derived key is used to perform a decryption operation. This is an example use of vault-locked key, whereby all key operations are performed with the key vault enclave and the key is never provided to a vault client. Further, the new key in this example may never exist outside the key vault enclave, because it was created (derived) from within the key vault enclave itself, and never provided to the key vault enclave from a vault client or elsewhere. For some embodiments and key use policies, a vault-locked key may be ephemeral in that it never leaves the secure container of the key vault enclave, even after sealing the key to the key vault enclave. Such an ephemeral key, such as might occur with a derived key used to temporarily secure a communications channel, may cease to exist anywhere when the container of the key vault enclave is destroyed or terminated. While the process of FIG. 23 illustrates how a vault-locked key may be used, the process of FIG. 23 may be also be used with a key that is not vault-locked, for example if key use policy allowed the key to return to the client that requested its creation.

In box 2302, the key vault enclave attests itself to the vault client. This may be required by the client because the client will provide a secret to be encrypted in box 2312. In box 2304, the key vault enclave may receive, for example from the vault client, an indication of a key use policy. The indication may, for example, be a data structure specifying the policy, or may be an identifier to be used with a registry of key use policies. The key use policy itself may indicate that this key should never be provided to any vault client. In box 2306, a new key is derived from a previously known root key, for example with the DeriveKey primitive described above. A request (not depicted) to derive the new key may be received by the key vault enclave from, for example, the vault client. In box 2308, the newly derived key may be stored securely according to the received key use policy.

The vault client may attest itself to the key vault enclave in box 2310. An attestation process may include receiving, at the key vault enclave, an attestation report or quote of the vault client. The received key use policy may restrict some or all uses of the new key to requests from requestors that are authenticated via software attestation. In boxes 2312-2316, a decryption operation, such as for the Decrypt primitive above, is performed using the key derived in box 2306. In other embodiments, other operations may be performed with a vault-locked key, such as encryption, signing, verifying a signature and deriving another new key from the key derived in box 2306 (deriving a second generation key from the root key). In box 2312, an encrypted data buffer is received from the vault client. The received encrypted data is decrypted with the derived key in box 1314, and the resulting decrypted data (in a decrypted data buffer) is sent to the vault client via the secure communications channel in box 2316.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as volatile or non-volatile storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. For purposes of this specification and the claims, the phrase "computer-readable storage medium" and variations thereof, does not include waves, signals, and/or other transitory and/or intangible communication media. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method for sealing enclave data, comprising:
   sending, to a source enclave hosted on a first native enclave platform, a first attestation report of a sealing enclave hosted on a second native enclave platform;
   receiving a permitted list and associated enclave data at the sealing enclave from the source enclave, wherein the permitted list includes a list of one or more enclave identities permitted to unseal the enclave data;
   securely storing the enclave data and the permitted list, wherein the securely storing includes:
      encrypting the enclave data with a key associated with the sealing enclave, by the sealing enclave, prior to receiving a request for the enclave data from a destination enclave to create sealed enclave data; and
      storing the sealed enclave data in persistent storage; and
   restricting access of the enclave data to enclaves with authenticated identities as permitted according to the permitted list, wherein the restricting includes:
      determining whether to send the enclave data from the sealing enclave to the destination enclave, which is different from the sealing enclave, based at least in part on whether the destination enclave is included in the list of the one or more enclave identities permitted to unseal the enclave data; and
      after determining that the enclave data is to be sent from the sealing enclave to the destination enclave based at least in part on the destination enclave being included in the list of the one or more enclave identities permitted to unseal the enclave data, decrypting the sealed enclave data in response to receipt of the request for the enclave data from the destination enclave.

2. The method of claim 1, wherein:
   the first native enclave platform is on a first computer and the second enclave native platform is hosted on a second computer.

3. The method of claim 1, wherein the permitted list is a list of abstract identity types; and further comprising:
   receiving a source attestation report of the source enclave; and
   deriving a permitted identity value from the source attestation report and an abstract identity type in the permitted list.

4. The method of claim 1, wherein the received enclave data is encrypted, and further comprising:
   executing an attestation process between the source enclave and the sealing enclave; and
   decrypting the encrypted enclave data with a key generated during the attestation process.

5. The method of claim 1, wherein the one or more enclave identities in the permitted list are specified by one or more public keys of the one or more respective enclaves.

6. The method of claim 1, wherein encrypting the enclave data with the key associated with the sealing enclave comprises:
   encrypting the enclave data with the key associated with the second native enclave platform on which the sealing enclave is hosted.

7. The method of claim 1, wherein storing the sealed enclave data comprises:
   storing the sealed enclave data in unsecure storage.

8. A method for sealing enclave data, comprising:
   receiving, at a source enclave hosted on a first native enclave platform, a first attestation report of a sealing enclave hosted on a second native enclave platform;
   verifying trust in the sealing enclave;
   partially completing a secure processing operation in the source enclave;
   sending a permitted list and associated enclave data to the sealing enclave, wherein the permitted list includes a list of one or more enclave identities permitted to unseal the enclave data, wherein the enclave data includes state data of the source enclave sufficient to permit another enclave instantiation to continue the partially completed secure processing operation, said sending comprising causing the sealing enclave to determine whether to send the enclave data to a destination enclave that is different from the sealing enclave based at least in part on whether the destination enclave is included in the list of the one or more enclave identities permitted to unseal the enclave data, wherein the permitted list is a list of abstract identity types corresponding to respective hierarchical levels of an identity hierarchy; and
   sending a source attestation report of the source enclave to the sealing enclave, wherein the source attestation report includes at least one identity value of the source enclave corresponding to an abstract identity type in the permitted list.

9. The method of claim 8, further comprising:
   an attestation process between the sealing enclave and the source enclave;
   generating encrypted enclave data by encrypting the enclave data with a key generated during the attestation process; and
   wherein the enclave data sent to the sealing enclave is the encrypted enclave data.

10. The method of claim 8, wherein:
   the first native enclave platform is on a first computer and the second native enclave platform is hosted on a second computer.

11. A system comprising at least a processor and memory storing thereon instructions that, when executed by the system, cause at least:
   sending, to a source enclave hosted on a first native enclave platform, a first attestation report of a sealing enclave hosted on a second native enclave platform;
   receiving a permitted list and associated enclave data from the source enclave, wherein the permitted list includes a list of one or more enclave identities permitted to unseal the enclave data;
   storing the enclave data and the permitted list securely, wherein the storing includes:

encrypting the enclave data with a key associated with the sealing enclave, by the sealing enclave, prior to receiving a request for the enclave data from a destination enclave to create sealed enclave data; and storing the sealed enclave data in persistent storage; and restricting access of the enclave data to enclaves with authenticated identities as permitted according to the permitted list, wherein the restricting includes:

determining whether to send the enclave data from the sealing enclave to the destination enclave, which is different from the sealing enclave, based at least in part on whether the destination enclave is included in the list of the one or more enclave identities permitted to unseal the enclave data; and after determining that the enclave data is to be sent from the sealing enclave to the destination enclave based at least in part on the destination enclave being included in the list of the one or more enclave identities permitted to unseal the enclave data, decrypting the sealed enclave data in response to receipt of the request for the enclave data from the destination enclave.

12. The system of claim 11, wherein:

the first native enclave platform is on a first computer and the second enclave native platform is hosted on a second computer.

13. The system of claim 11, wherein the permitted list is a list of abstract identity types, and the instructions further cause at least:

receiving a source attestation report of the source enclave; and deriving a permitted identity values from the source attestation report and an abstract identity type in the permitted list.

14. The system of claim 11, wherein the received enclave data is encrypted, and the instructions further cause at least:

running an attestation process between the source enclave and the sealing enclave; and decrypting the encrypted enclave data with a key generated during the attestation process.

15. The system of claim 11, wherein the one or more enclave identities in the permitted list are specified by one or more public keys of the one or more respective enclaves.

16. The system of claim 11, wherein the instructions, when executed by the system, further cause at least:

encrypting the enclave data, which is provided by decrypting the sealed enclave data in response to receipt of the request for the enclave data from the destination enclave, with a key generated during attestation of the destination enclave to the sealing enclave.

17. The system of claim 11, wherein the enclave data includes state data of the source enclave.

18. A system comprising at least a processor and memory storing thereon instructions that, when executed by the system, cause at least:

receiving, at a source enclave hosted on a first native enclave platform, a first attestation report of a sealing enclave hosted on a second native enclave platform;

verifying trust in the sealing enclave;

partially completing a secure processing operation in the source enclave;

sending a permitted list and associated enclave data to the sealing enclave, wherein the permitted list includes a list of one or more enclave identities permitted to unseal the enclave data, wherein the enclave data includes state data of the source enclave sufficient to permit another enclave instantiation to continue the partially completed secure processing operation, said sending comprising causing the sealing enclave to determine whether to send the enclave data to a destination enclave that is different from the sealing enclave based at least in part on whether the destination enclave is included in the list of the one or more enclave identities permitted to unseal the enclave data, wherein the permitted list is a list of abstract identity types corresponding to respective hierarchical levels of an identity hierarchy; and sending a source attestation report of the source enclave to the sealing enclave, wherein the source attestation report includes at least one identity value of the source enclave corresponding to an abstract identity type in the permitted list.

19. The system of claim 18, wherein the instructions further cause at least:

an attestation process between the sealing enclave and the source enclave;

generating encrypted enclave data by encrypting the enclave data with a key generated during the attestation process; and wherein the enclave data sent to the sealing enclave is the encrypted enclave data.

20. The system of claim 18, wherein:

the first native enclave platform is on a first computer and the second native enclave platform is hosted on a second computer.

* * * * *